(12) United States Patent
Kondo

(10) Patent No.: US 10,274,704 B2
(45) Date of Patent: Apr. 30, 2019

(54) IMAGING LENS AND IMAGING APPARATUS

(71) Applicant: FUJIFILM Corporation, Tokyo (JP)

(72) Inventor: Masato Kondo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/718,281

(22) Filed: Sep. 28, 2017

(65) Prior Publication Data

US 2018/0100988 A1 Apr. 12, 2018

(30) Foreign Application Priority Data

Oct. 6, 2016 (JP) ................................. 2016-197954

(51) Int. Cl.
*G02B 7/04* (2006.01)
*G02B 13/00* (2006.01)
*G02B 9/14* (2006.01)
*G02B 13/02* (2006.01)

(52) U.S. Cl.
CPC .............. *G02B 13/006* (2013.01); *G02B 7/04* (2013.01); *G02B 9/14* (2013.01); *G02B 13/02* (2013.01)

(58) Field of Classification Search
CPC ........... G02B 13/006; G02B 7/04; G02B 9/14
USPC ....................................................... 359/786
See application file for complete search history.

(56) References Cited

U.S. PATENT DOCUMENTS

| 4,852,984 | A | * | 8/1989 | Takahashi | G02B 13/02 359/748 |
| 8,643,960 | B2 | | 2/2014 | Hayashi et al. | |
| 8,767,319 | B2 | * | 7/2014 | Souma | G02B 13/02 359/672 |
| 9,116,286 | B2 | | 8/2015 | Hayashi et al. | |

FOREIGN PATENT DOCUMENTS

| JP | 2012-242690 A | 12/2012 |
| JP | 5601598 B2 | 10/2014 |
| JP | 5628090 B2 | 11/2014 |

* cited by examiner

*Primary Examiner* — James R Greece
(74) *Attorney, Agent, or Firm* — Studebaker & Brackett PC

(57) ABSTRACT

The imaging lens includes, in order from the object side, a first lens group having a positive refractive power, a second lens group having a negative refractive power, and a third lens group having a positive refractive power. During focusing, only the second lens group moves in the direction of the optical axis. A lens closest to the object side in the first lens group has a positive refractive power. The second lens group includes two or three lenses, a lens closest to the object side is a meniscus lens which is concave toward the object side and has a positive refractive power, and a lens adjacent thereto on the image side has a negative refractive power. A lens closest to the image side in the third lens group is a single lens which is concave toward the object side and has a negative refractive power. Further, predetermined Conditional Expression (1) is satisfied.

20 Claims, 17 Drawing Sheets

EXAMPLE 1

EXAMPLE 1

EXAMPLE 1

EXAMPLE 2

EXAMPLE 3

EXAMPLE 6

EXAMPLE 7

EXAMPLE 7

IMAGING LENS AND IMAGING APPARATUS

CROSS REFERENCE TO RELATED APPLICATIONS

The present application claims priority under 35 U.S.C. § 119 to Japanese Patent Application No. 2016-197954 filed on Oct. 6, 2016. The above application is hereby expressly incorporated by reference, in its entirety, into the present application.

BACKGROUND

Field of the Invention

The present invention relates to an imaging lens, which is appropriate for electronic cameras such as a digital camera and a video camera, and an imaging apparatus which comprises the imaging lens.

Related Art

In the related art, as an imaging lens used in cameras in the above-mentioned field, an inner focus type imaging lens has been proposed in which focusing is performed by moving a part of the lens group in the middle portion of the lens system in the direction of the optical axis. Compared with an entire group extension type in which focusing is performed by moving the entire lens system, the inner focus type has an advantage that a light focusing operation and high-speed auto focusing control can be performed. For example, in JP5601598B, JP2012-242690A, and JP5628090B, in order from the object side, an inner focus type imaging lens, which includes first to third lens groups and performs focusing by moving the entirety or a part of the second lens group, has been proposed.

SUMMARY

In recent years, since the number of imaging pixels of a camera has increased, there has been a demand for the above-mentioned inner focus type imaging lens to correct various aberrations at a higher level. Further, there has been a demand for an imaging lens capable of performing focusing at a higher speed.

In the imaging lens described in JP5601598B, the number of lenses constituting the second lens group to be moved during focusing is large. Therefore, although fluctuations in various aberrations during focusing can be satisfactorily corrected, it is difficult to perform focusing at high speed. Further, in the imaging lenses described in JP2012-242690A and JP5628090B, since only one lens is moved during focusing, it is possible to perform focusing at high speed. However, in the case of one lens, it is difficult to suppress fluctuations in various aberrations during focusing. Furthermore, in the imaging lenses described in JP5601598B, JP2012-242690A, and JP5628090B, various aberrations are not sufficiently corrected.

The present invention has been made in view of the above situations, and an object of the present invention is to provide an inner focus type imaging lens, which is capable of performing focusing at high speed and suppressing fluctuations in various aberrations during focusing and in which various aberrations are satisfactorily corrected, and an imaging apparatus comprising the imaging lens.

An imaging lens of the present invention comprises, in order from an object side: a first lens group that has a positive refractive power; a second lens group that has a negative refractive power; and a third lens group that has a positive refractive power.

During focusing from an object at infinity to a closest object, only the second lens group moves in a direction of an optical axis.

A lens closest to the object side in the first lens group has a positive refractive power.

The second lens group includes two or three lenses, a lens closest to the object side in the second lens group is a meniscus lens which is concave toward the object side and has a positive refractive power, and a lens adjacent to the lens closest to the object side on an image side in the second lens group has a negative refractive power.

A lens closest to the image side in the third lens group is a single lens which is concave toward the object side and has a negative refractive power.

The following conditional expression is satisfied.

$$1.2 < (R21 + R22)/(R21 - R22) < 3.5 \qquad (1)$$

Here, R21 is a radius of curvature of an object side surface of the lens closest to the object side in the second lens group, and R22 is a radius of curvature of an image side surface of the lens closest to the object side in the second lens group.

In the imaging lens of the present invention, it is preferable that the first lens group has at least one group of cemented lenses in which at least one lens having a positive refractive power and at least one lens having a negative refractive power are combined.

In the imaging lens of the present invention, it is preferable that the lens closest to the object side in the second lens group and the lens adjacent to the lens closest to the object side on the image side are cemented, a refractive index of the lens closest to the object side in the second lens group is greater than a refractive index of the lens adjacent to the lens closest to the object side on the image side.

It is preferable that the imaging lens of the present invention satisfies the following conditional expression.

$$1.70 < N2 < 2.2 \qquad (2)$$

Here, N2 is a refractive index of the lens closest to the object side in the second lens group.

It is preferable that the imaging lens satisfies the following conditional expression.

$$60 < \nu 1 max < 90 \qquad (3)$$

Here, $\nu 1max$ is a maximum value of Abbe numbers of lenses constituting the first lens group.

It is preferable that the imaging lens satisfies the following conditional expression.

$$60 < \nu 3 max < 90 \qquad (4)$$

Here, $\nu 3max$ is a maximum value of Abbe numbers of lenses constituting the third lens group.

It is preferable that the imaging lens satisfies the following conditional expression.

$$-2.5 < f/f2 < -1.0 \qquad (5)$$

Here, f is a focal length of the whole system in a state where the object at infinity is in focus, and f2 is a focal length of the second lens group.

It is preferable that the imaging lens satisfies the following conditional expression.

$$0.9 < f/f1 < 1.5 \qquad (6)$$

Here, f is a focal length of the whole system in a state where the object at infinity is in focus, and
f1 is a focal length of the first lens group.
It is preferable that the imaging lens satisfies the following conditional expression.

$$1.0 < f/f3 < 2.0 \quad (7)$$

Here, f is a focal length of the whole system in a state where the object at infinity is in focus, and
f3 is a focal length of the third lens group.
It is preferable that the imaging lens satisfies the following conditional expression.

$$15 < v21 < 30 \quad (8)$$

Here, v21 is an Abbe number of the lens closest to the object side in the second lens group.
It is preferable that the imaging lens satisfies the following conditional expression.

$$1.65 < N1 < 2.2 \quad (9)$$

Here, N1 is a refractive index of the lens closest to the object side in the first lens group.
It is preferable that the imaging lens satisfies the following conditional expression.

$$15 < \Delta v1r < 50 \quad (10)$$

Here, $\Delta v1r$ is a difference in Abbe number between a lens closest to the image side in the first lens group and a lens adjacent to the lens closest to the image side on the object side.
It is preferable that the imaging lens satisfies the following conditional expression.

$$0.10 < BF/f < 0.50 \quad (11)$$

Here, BF is an air conversion length from an image side surface of the lens, which is closest to the image side, to the image plane, and
f is a focal length of the whole system in a state where the object at infinity is in focus.
It is preferable that the imaging lens of the present invention satisfies any one of Conditional Expressions (1-1) to (6-1). In addition, the imaging lens of the present invention may satisfy any one of Conditional Expressions (1) to (11) and (1-1) to (6-1), or may satisfy an arbitrary combination thereof.

$$1.3 < (R21+R22)/(R21-R22) < 3.0 \quad (1\text{-}1)$$

$$1.80 < N2 < 2.2 \quad (2\text{-}1)$$

$$65 < v1\max < 90 \quad (3\text{-}1)$$

$$65 < v3\max < 90 \quad (4\text{-}1)$$

$$-2.2 < f/f2 < -1.4 \quad (5\text{-}1)$$

$$1.0 < f/f1 < 1.4 \quad (6\text{-}1)$$

Here, R21 is a radius of curvature of an object side surface of the lens closest to the object side in the second lens group,
R22 is a radius of curvature of an image side surface of the lens closest to the object side in the second lens group,
N2 is a refractive index of the lens closest to the object side in the second lens group,
v1max is a maximum value of Abbe numbers of lenses constituting the first lens group,
v3max is a maximum value of Abbe numbers of lenses constituting the third lens group,
f is a focal length of the whole system in a state where the object at infinity is in focus,
f1 is a focal length of the first lens group, and
f2 is a focal length of the second lens group.

An imaging apparatus of the present invention comprises the imaging lens of the present invention.

The term "comprises ~" means that the lens may include not only the lens groups or the lenses as elements but also lenses substantially having no powers, optical elements, which are not lenses, such as a stop, a mask, a cover glass, and a filter, and mechanism parts such as a lens flange, a lens barrel, an imaging element, and a hand shaking correction mechanism.

Further, the "lens group" is not necessarily formed of a plurality of lenses, but may be formed as only one lens. The term "~ lens group that has a positive refractive power" means that the lens group has a positive refractive power as a whole. It is the same for the term "~ lens group that has a negative refractive power".

Reference signs of refractive powers of the lenses, surface shapes of the lenses, and radii of curvature of surfaces of the lenses are assumed as those in paraxial regions in a case where some lenses have aspheric surfaces. Reference signs of radii of curvature of surface shapes convex toward the object side are set to be positive, and reference signs of radii of curvature of surface shapes convex toward the image side are set to be negative. Further, in the present invention, the conditional expressions relate to the d line (a wavelength of 587.6 nm) unless otherwise specified.

The imaging lens of the present invention includes, in order from an object side: a first lens group that has a positive refractive power; a second lens group that has a negative refractive power; and a third lens group that has a positive refractive power. During focusing from an object at infinity to a closest object, only the second lens group moves in a direction of an optical axis. A lens closest to the object side in the first lens group has a positive refractive power. The second lens group includes two or three lenses, a lens closest to the object side in the second lens group is a meniscus lens which is concave toward the object side and has a positive refractive power, and a lens adjacent to the lens closest to the object side on an image side in the second lens group has a negative refractive power. A lens closest to the image side in the third lens group is a single lens which is concave toward the object side and has a negative refractive power. Conditional Expression (1) is satisfied. Hence, it is possible to perform focusing at high speed while suppressing fluctuations in various aberrations during focusing, and it is possible to satisfactorily correct various aberrations.

Further, the imaging apparatus of the present invention comprises the imaging lens of the present invention. Thus, it is possible to perform focusing at high speed, and it is possible to obtain high quality videos.

DETAILED DESCRIPTION

Figure 1:
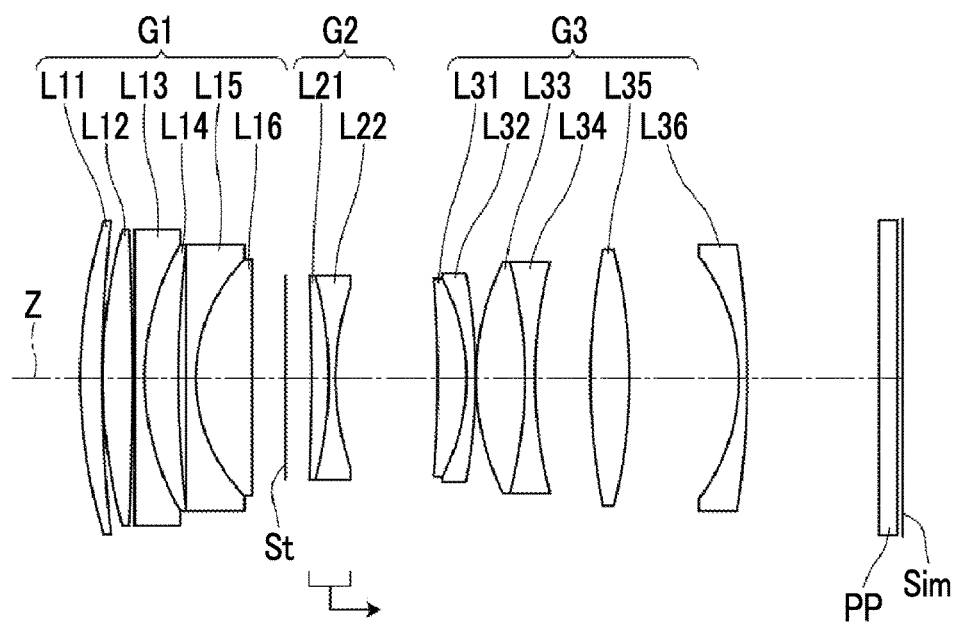
FIG. 1 is a cross-sectional view illustrating a lens configuration of an imaging lens (common to Example 1) according to an embodiment of the present invention.
Figure 2:
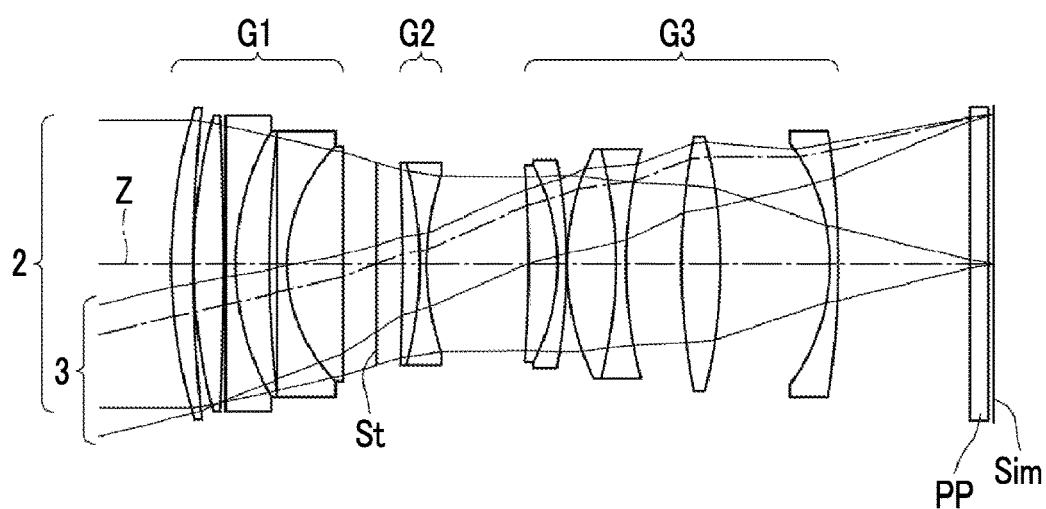
FIG. 2 is an optical path diagram of an imaging lens (common to Example 1) according to an embodiment of the present invention.

Hereinafter, embodiments of the present invention will be described with reference to drawings. FIG. 1 is a cross-sectional view illustrating a lens configuration of an imaging lens (common to Example 1) according to an embodiment of the present invention. The exemplary configuration shown in FIG. 1 is the same as the configuration of the imaging lens of Example 1 to be described later. In FIG. 1, the left side is the object side, and the right side is the image side. Further, FIG. 2 shows an optical path diagram of an imaging lens according to an embodiment shown in FIG. 1, and shows optical paths of on-axis rays 2 and rays with the maximum angle of view 3 from the object point at the infinite distance. FIGS. 1 and 2 and FIGS. 3 to 11 to be described later show lens configurations in a state where the object at infinity is in focus.

As shown in FIGS. 1 and 2, the imaging lens of the present embodiment includes, in order from the object side along an optical axis Z, a first lens group G1 having a positive refractive power, a second lens group G2 having a negative refractive power, a third lens group G3 having a positive refractive power. An aperture stop St is disposed between the first lens group G1 and the second lens group G2. It should be noted that the aperture stop St does not necessarily indicate its size and shape, and indicates a position of the stop on the optical axis Z. Further, an inner focus type, in which only the second lens group G2 moves toward the image side in the direction of the optical axis during focusing from the object at infinity to the closest object, is employed. In addition, during focusing, the first lens group G1, the third lens group G3, and the aperture stop St do not move.

In the example shown in FIG. 1, the first lens group G1 includes, in order from the object side, six lenses, that is, lenses L11 to L16, the second lens group G2 includes, in order from the object side, two lenses, that is, lenses L21 and L22, and the third lens group G3 includes, in order from the object side, six lenses, that is, lenses L31 to L36. However, each lens group may include lenses of which the number is different from that in the example shown in FIG. 1. In particular, the second lens group G2 may include three lenses.

In a case where the imaging lens of the present embodiment is intended to be applied to an imaging apparatus, in accordance with a configuration of a camera on which the lens is mounted, it is preferable that a cover glass, a prism, and various filters such as an infrared cut filter and a lowpass filter are disposed between the optical system and the image plane Sim. Thus, FIG. 1 shows an example in which an optical member PP of a plane-parallel plate assumed as the above-mentioned elements is disposed between the lens system and the image plane Sim.

In the imaging lens of the present embodiment, the lens L11 closest to the object side in the first lens group G1 has a positive refractive power. Further, the lens L21 closest to the object side in the second lens group G2 is a meniscus lens which is concave toward the object side and has a positive refractive power, and the lens L22 adjacent to the lens L21 closest to the object side on the image side has a negative refractive power. Furthermore, the lens L36 closest to the image side in the third lens group G3 is a single lens which is concave toward the object side and has a negative refractive power.

The imaging lens of the present embodiment is configured to satisfy Conditional Expression (1).

$$1.2 < (R21+R22)/(R21-R22) < 3.5 \quad (1)$$

Here, R21 is a radius of curvature of an object side surface of the lens L21 closest to the object side in the second lens group G2, and R22 is a radius of curvature of an image side surface of the lens L21 closest to the object side in the second lens group G2.

In the imaging lens of the present embodiment, during focusing from the object at infinity to the closest object, only the second lens group G2 including two or three lenses is moved to the image side in the direction of the optical axis, and thus it is possible to reduce the weight of the focusing group. As a result, it is possible to perform focusing at high speed. Further, it is possible to reduce the size of the lens system.

Further, by making the lens L11 closest to the object side in the first lens group G1 have a positive refractive power, it is possible to shorten the total length of the lens system. Furthermore, it is possible to minimize the height of the on-axis rays, which are incident into the second lens group G2, and minimize the size of the entire diameter of the second lens group G2.

Further, by making the second lens group G2 include two or three lenses, fluctuations in various aberrations can be suppressed during focusing from the infinity to the close-range object. The lens L21 closest to the object side in the second lens group G2 is a meniscus lens which is concave toward the object side and has a positive refractive power, and the lens L22 adjacent to the lens L21 closest to the object side on the image side has a negative refractive power. With such a configuration, it is possible to satisfactorily correct chromatic aberration.

Further, by making the lens L36 closest to the image side in the third lens group G3 as a single lens which is concave toward the object side and has a negative refractive power, it is possible to improve the Petzval sum, it is possible to shorten the total length of the lens system, and it is possible to correct distortion. In particular, by using a lens which is concave toward the object side, it is possible to satisfactorily correct astigmatism.

Further, by not allowing the result of Conditional Expressions (1) to be equal to or less than the lower limit, it is possible to satisfactorily suppress astigmatism. By not allowing the result of Conditional Expressions (1) to be equal to or greater than the upper limit, it is possible to satisfactorily suppress field curvature and longitudinal chromatic aberration. In order to more enhance the effect of Conditional Expression (1), it is more preferable that Conditional Expression (1-1) is satisfied.

$$1.3 < (R21+R22)/(R21-R22) < 3.0 \tag{1-1}$$

Further, in the imaging lens of the present embodiment, it is preferable that the first lens group G1 has at least one group of cemented lenses in which at least one lens having a positive refractive power and at least one lens having a negative refractive power are combined. Thereby, there is an advantage in correction of chromatic aberration. In addition, in the imaging lens of the present embodiment shown in FIG. 1, the first lens group G1 has two groups of cemented lenses including: cemented lenses in which a lens L13 having a negative refractive power and a lens L14 having a positive refractive power are combined; and cemented lenses in which a lens L15 having a negative refractive power and a lens L16 having a positive refractive power are combined.

Further, in the imaging lens of the present embodiment, it is preferable that a lens L21 closest to the object side in the second lens group G2 and a lens L22 adjacent to the lens L21 closest to the object side on the image side are cemented, and a refractive index of the lens L21 closest to the object side is greater than a refractive index of the lens L22 adjacent thereto on the image side. Thereby, it is possible to satisfactorily correct longitudinal chromatic aberration and lateral chromatic aberration. In particular, by making a refractive index of the lens L21, which is closest to the object side and has the positive refractive power, greater than a refractive index of the lens L22 which is adjacent thereto on the image side and has the negative refractive power, it is possible to satisfactorily correct chromatic aberration, and it is possible to satisfactorily correct spherical aberration.

Further, in the imaging lens of the present embodiment, it is preferable that the third lens group G3 has at least one group of cemented lenses in which at least one lens having a positive refractive power and at least one lens having a negative refractive power are combined. Thereby, there is an advantage in correction of chromatic aberration. In addition, in the imaging lens of the present embodiment shown in FIG. 1, the third lens group G3 has two groups of cemented lenses including: cemented lenses in which a lens L31 having a positive refractive power and a lens L32 having a negative refractive power are combined; and cemented lenses in which a lens L33 having a positive refractive power and a lens L34 having a negative refractive power are combined.

It is preferable that the imaging lens of the present embodiment satisfies Conditional Expression (2).

$$1.70 < N2 < 2.2 \tag{2}$$

Here, N2 is a refractive index of the lens closest to the object side in the second lens group G2.

By not allowing the result of Conditional Expression (2) to be equal to or less than the lower limit, it is possible to suppress fluctuations in various aberrations during focusing. By not allowing the result of Conditional Expression (2) to be equal to or greater than the upper limit, it is possible to suppress an increase in amount of movement of the second lens group G2 during focusing from the infinity to the close-range object. Thereby, it is possible to suppress an increase in total length of the lens system.

In order to more enhance the effect of Conditional Expression (2), it is more preferable that Conditional Expression (2-1) is satisfied.

$$1.80 < N2 < 2.2 \tag{2-1}$$

It is preferable that Conditional Expression (3) is satisfied.

$$60 < \nu1max < 90 \tag{3}$$

Here, ν1max is a maximum value of Abbe numbers of lenses constituting the first lens group G1.

By not allowing the result of Conditional Expression (3) to be equal to or less than the lower limit, it is possible to satisfactorily correct chromatic aberration. By not allowing the result of Conditional Expression (3) to be equal to or greater than the upper limit, it is possible to prevent chromatic aberration from being excessively corrected.

In order to more enhance the effect of Conditional Expression (3), it is more preferable that Conditional Expression (3-1) is satisfied.

$$65 < \nu1max < 90 \tag{3-1}$$

It is preferable that Conditional Expression (4) is satisfied.

$$60 < \nu3max < 90 \tag{4}$$

Here, ν3max is a maximum value of Abbe numbers of lenses constituting the third lens group G3.

By not allowing the result of Conditional Expression (4) to be equal to or less than the lower limit, it is possible to satisfactorily correct chromatic aberration. By not allowing the result of Conditional Expression (4) to be equal to or greater than the upper limit, it is possible to prevent chromatic aberration from being excessively corrected.

In order to more enhance the effect of Conditional Expression (4), it is more preferable that Conditional Expression (4-1) is satisfied.

$$65 < \nu3max < 90 \tag{4-1}$$

It is preferable that Conditional Expression (5) is satisfied.

$$-2.5 < f/f2 < -1.0 \tag{5}$$

Here, f is a focal length of the whole system in a state where the object at infinity is in focus, and f2 is a focal length of the second lens group G2.

By not allowing the result of Conditional Expression (5) to be equal to or less than the lower limit, the refractive power of the second lens group G2 is prevented from becoming excessively strong, and thus it is possible to suppress fluctuations in spherical aberration, astigmatism, and chromatic aberration caused by focusing. Thereby, it is possible to obtain favorable optical performance on the proximity side. By not allowing the result of Conditional Expression (5) to be equal to or greater than the upper limit, it is possible to minimize the amount of movement of the second lens group G2 during focusing. Thus, it is possible to shorten a period of time up to focusing. Thereby, it is possible to perform focusing at high speed. Further, it becomes easy to secure a space for arranging mechanical components on the object side and the image side of the second lens group G2.

In order to more enhance the effect of Conditional Expression (5), it is more preferable that Conditional Expression (5-1) is satisfied.

$$2.2 < f/f2 < -1.4 \quad (5\text{-}1)$$

It is preferable that Conditional Expression (6) is satisfied.

$$0.9 < f/f1 < 1.5 \quad (6)$$

Here, f is a focal length of the whole system in a state where the object at infinity is in focus, and f1 is a focal length of the first lens group G1.

By not allowing the result of Conditional Expression (6) to be equal to or less than the lower limit, it is possible to secure the positive refractive power of the first lens group G1. Thus, it is possible to shorten the total length of the lens system. By not allowing the result of Conditional Expression (6) to be equal to or greater than the upper limit, it is possible to suppress the positive refractive power of the first lens group G1. Thus, it is possible to suppress spherical aberration and astigmatism.

In order to more enhance the effect of Conditional Expression (6), it is more preferable that Conditional Expression (6-1) is satisfied.

$$1.0 < f/f1 < 1.4 \quad (6\text{-}1)$$

It is preferable that Conditional Expression (7) is satisfied.

$$1.0 < f/f3 < 2.0 \quad (7)$$

Here, f is a focal length of the whole system in a state where the object at infinity is in focus, and f3 is a focal length of the third lens group G3.

By not allowing the result of Conditional Expression (7) to be equal to or less than the lower limit, it is possible to secure the positive refractive power of the third lens group G3. Thus, it is possible to shorten the total length of the lens system. By not allowing the result of Conditional Expression (7) to be equal to or greater than the upper limit, it is possible to suppress the positive refractive power of the third lens group G3. Thus, it is possible to suppress spherical aberration and astigmatism.

In order to more enhance the effect of Conditional Expression (7), it is more preferable that Conditional Expression (7-1) is satisfied.

$$1.2 < f/f3 < 1.8 \quad (7\text{-}1)$$

It is preferable that Conditional Expression (8) is satisfied.

$$15 < v21 < 30 \quad (8)$$

Here, v21 is an Abbe number of the lens L21 closest to the object side in the second lens group G2.

By not allowing the result of Conditional Expression (8) to be equal to or less than the lower limit, it is possible to satisfactorily correct chromatic aberration. By not allowing the result of Conditional Expression (8) to be equal to or greater than the upper limit, it is possible to prevent chromatic aberration from being excessively corrected.

In order to more enhance the effect of Conditional Expression (8), it is more preferable that Conditional Expression (8-1) is satisfied.

$$15 < v21 < 25 \quad (8\text{-}1)$$

It is preferable that Conditional Expression (9) is satisfied.

$$1.65 < N1 < 2.2 \quad (9)$$

Here, N1 is a refractive index of the lens L11 closest to the object side in the first lens group G1.

By not allowing the result of Conditional Expression (9) to be equal to or less than the lower limit, it is possible to suppress an increase in total length of the lens system. By not allowing the result of Conditional Expression (9) to be equal to or greater than the upper limit, it is possible to satisfactorily correct spherical aberration.

In order to more enhance the effect of Conditional Expression (9), it is more preferable that Conditional Expression (9-1) is satisfied.

$$1.70 < N1 < 2.1 \quad (9\text{-}1)$$

It is preferable that Conditional Expression (10) is satisfied.

$$15 < \Delta v1r < 50 \quad (10)$$

Here, $\Delta v1r$ is a difference in Abbe number between a lens L16 closest to the image side in the first lens group G1 and a lens L15 adjacent to the lens L16 closest to the image side on the object side.

By not allowing the result of Conditional Expression (10) to be equal to or less than the lower limit, it is possible to satisfactorily correct chromatic aberration. By not allowing the result of Conditional Expression (10) to be equal to or greater than the upper limit, it is possible to prevent chromatic aberration from being excessively corrected.

In order to more enhance the effect of Conditional Expression (10), it is more preferable that Conditional Expression (10-1) is satisfied.

$$21 < \Delta v1r < 45 \quad (10\text{-}1)$$

It is preferable that Conditional Expression (11) is satisfied.

$$0.10 < BF/f < 0.50 \quad (11)$$

Here, BF is an air conversion length from an image side surface of the lens, which is closest to the image side, to the image plane, and f is a focal length of the whole system in a state where the object at infinity is in focus.

By not allowing the result of Conditional Expression (11) to be equal to or less than the lower limit, it is possible to secure a back focal length necessary for an interchangeable lens. By not allowing the result of Conditional Expression (11) to be equal to or greater than the upper limit, it is possible to suppress the total length of the lens system.

In order to more enhance the effect of Conditional Expression (11), it is more preferable that Conditional Expression (11-1) is satisfied.

$$0.15 < BF/f < 0.45 \quad (11\text{-}1)$$

In the imaging lens of the present embodiment, as the material closest to the object side, specifically, glass is preferably used, or transparent ceramics may be used.

In a case where the imaging lens of the present embodiment is used under a severe environment, it is preferable to apply a multilayer film coating for protection. Not only the protective coating but also antireflective coating for reducing ghost light in use may be performed.

In the example shown in FIG. 1, the optical member PP is disposed between the lens system and the image plane Sim. However, various filters such as a lowpass filter or a filter for cutting off a specific wavelength region may not be disposed between the lens system and the image plane Sim. Instead, such various filters may be disposed between the lenses, or coating for functions the same as those of various filters may be performed on a lens surface of any lens.

The above-mentioned preferred configurations and available configurations including the configurations relating to Conditional Expressions may be arbitrary combinations, and it is preferable to selectively adopt the configurations in accordance with required specification. For example, the imaging lens according to the present embodiment satisfies Conditional Expression (1), but may satisfy any one of Conditional Expressions (1) to (11) and Conditional Expressions (1-1) to (11-1), and may satisfy an arbitrary combination of Conditional Expressions.

Next, numerical examples of the imaging lens of the present invention will be described.

First, an imaging lens of Example 1 will be described. FIG. 1 is a cross-sectional view illustrating a lens configuration and optical paths of the imaging lens of Example 1. In addition, in FIG. 1 and FIGS. 3 to 11 corresponding to Examples 2 to 10, the optical member PP is additionally shown. Further, the left side is an object side, and the right side is an image side. In addition, an aperture stop St shown in the drawing does not necessarily show its real size and shape, but show a position on an optical axis Z.

Table 1 shows basic lens data of the imaging lens of Example 1, Table 2 shows data about specification, and Table 3 shows data about moved surface spacings. Hereinafter, meanings of the reference signs in the tables are, for example, as described in Example 1, and are basically the same as those in Examples 2 to 10.

In the lens data of Table 1, the column of Si shows i-th (i=1, 2, 3, . . . ) surface number. The i-th surface number sequentially increases toward the image side in a case where a surface of an element closest to the object side is regarded as a first surface. The column of Ri shows a radius of curvature of the i-th surface. The column of Di shows a surface spacing on the optical axis Z between the i-th surface and an (i+1)th surface. Further, the column of Ndj shows a refractive index of a j-th (j=1, 2, 3, . . . ) optical element at the d line (a wavelength of 587.6 nm), where j sequentially increases toward the image side in a case where the optical element closest to the object side is regarded as the first element. The column of vdj shows an Abbe number of the j-th optical element on the basis of the d line (a wavelength of 587.6 nm).

It should be noted that the sign of the radius of curvature is positive in a case where a surface has a shape convex toward the object side, and is negative in a case where a surface has a shape convex toward the image side. The basic lens data additionally shows the aperture stop St and the optical member PP. In a place of a surface number of a surface corresponding to the aperture stop St, the surface number and a term of (stop) are noted. Further, in the lens data of Table 1, in each place of the surface spacing which is variable during focusing, DD[i] is noted.

In the data about the specification of Table 2, values of the focal length f, the back focal length BF, the F number FNo., and the total angle of view 2ω of the whole system in a state where the object at infinity is in focus are noted. Further, in the data about the moved surface spacings of Table 3, moved surface spacings respectively in a state where the object at infinity is in focus and in a state where the closest object is in focus (at a distance of 110 cm) are denoted.

In data of each table, unless otherwise specified, a degree is used as a unit of an angle, and mm is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1·Lens Data

| Si | Ri | Di | Ndj | vdj |
|---|---|---|---|---|
| 1 | 98.0201 | 3.9500 | 1.95375 | 32.32 |
| 2 | 265.8358 | 0.1000 | | |
| 3 | 106.1474 | 5.3200 | 1.55032 | 75.50 |
| 4 | −625.6445 | 0.3600 | | |
| 5 | ∞ | 1.7300 | 1.56732 | 42.81 |
| 6 | 49.3830 | 5.9800 | 1.88300 | 39.22 |
| 7 | 192.1886 | 1.4900 | | |
| 8 | ∞ | 1.7000 | 1.63980 | 34.49 |
| 9 | 30.7780 | 10.1000 | 1.55032 | 75.50 |
| 10 | ∞ | 6.0100 | | |
| 11 (Stop) | ∞ | DD[11] | | |
| 12 | −380.4254 | 3.0700 | 1.95906 | 17.47 |
| 13 | −70.6290 | 1.2200 | 1.85150 | 40.78 |
| 14 | 51.2612 | DD[14] | | |
| 15 | −230.3817 | 5.1800 | 1.55032 | 75.50 |
| 16 | −39.2300 | 1.6300 | 1.68893 | 31.16 |
| 17 | −102.2608 | 0.1000 | | |
| 18 | 48.4494 | 8.7500 | 1.59282 | 68.62 |
| 19 | −82.6540 | 1.8000 | 1.76182 | 26.61 |
| 20 | 82.6540 | 9.9600 | | |
| 21 | 119.8382 | 7.0400 | 2.00100 | 29.13 |
| 22 | −96.6341 | 19.5100 | | |
| 23 | −37.7586 | 1.4700 | 1.51680 | 64.21 |
| 24 | −163.9992 | 23.8566 | | |
| 25 | ∞ | 3.2000 | 1.51680 | 64.20 |
| 26 | ∞ | 1.0003 | | |

TABLE 2

Example1·Specification

| f | 108.47 |
|---|---|
| BF | 26.97 |
| FNo. | 2.06 |
| 2ω [°] | 29.8 |

TABLE 3

Example 1·Moved Surface Spacing

| | Infinity | 110 cm |
|---|---|---|
| DD[11] | 4.7000 | 13.31 |
| DD[14] | 18.1900 | 9.58 |

Figure 12:
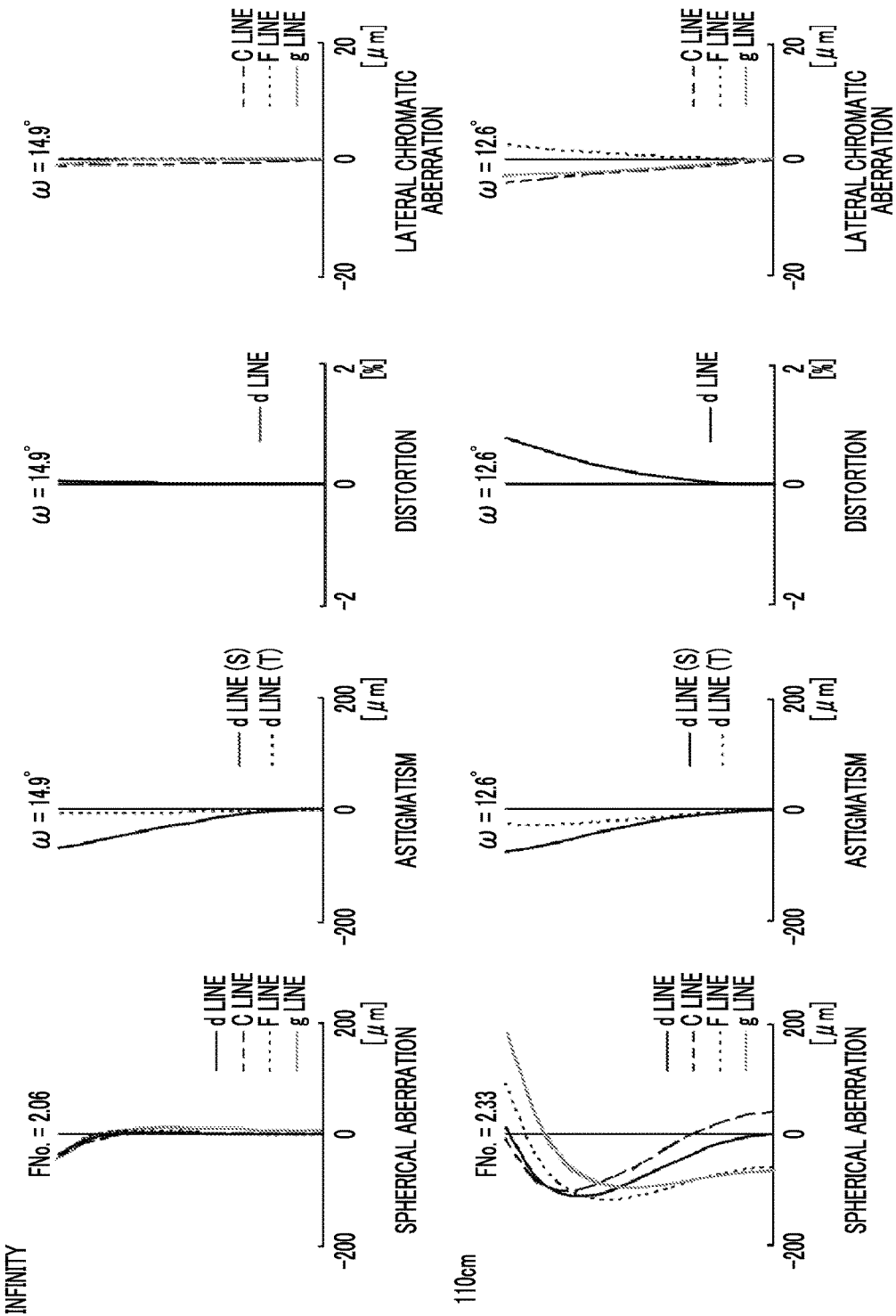
FIG. 12 is a diagram of aberrations of the imaging lens of Example 1 of the present invention.

FIG. 12 shows a diagram of aberrations of the imaging lens of Example 1. In addition, in order from the upper left side of FIG. 12, spherical aberration, astigmatism, distortion, and lateral chromatic aberration in a state where the focus is at infinity are shown. In order from the lower left side of FIG. 12, spherical aberration, astigmatism, distortion, and lateral chromatic aberration in a state where focus is in a closest range (at a distance of 110 cm) are shown. The aberration diagrams illustrating spherical aberration, astigmatism, and distortion indicate aberrations that occur in a case where the d line (a wavelength of 587.6 nm) is set as a reference wavelength. In the spherical aberration diagram, aberrations at the d line (a wavelength of 587.6 nm), the C line (a wavelength of 656.3 nm), the F line (a wavelength of 486.1 nm), and the g line (a wavelength of 435.8 nm) are respectively indicated by the solid line, the long dashed line, the short dashed line, and the gray solid line. In the astigmatism diagram, aberrations in sagittal and tangential directions are respectively indicated by the solid line and the short dashed line. In the lateral chromatic aberration diagram, aberrations at the C line (a wavelength of 656.3 nm), the F line (a wavelength of 486.1 nm), and the g line (a wavelength of 435.8 nm) are respectively indicated by the long dashed line, the short dashed line, and the gray solid line. In the spherical aberration diagram, FNo. indicates an F number. In the other aberration diagrams, ω indicates a half angle of view.

In the description of Example 1, reference signs, meanings, and description methods of the respective data pieces are the same as those in the following examples unless otherwise noted. Therefore, in the following description, repeated description will be omitted.

Figure 3:
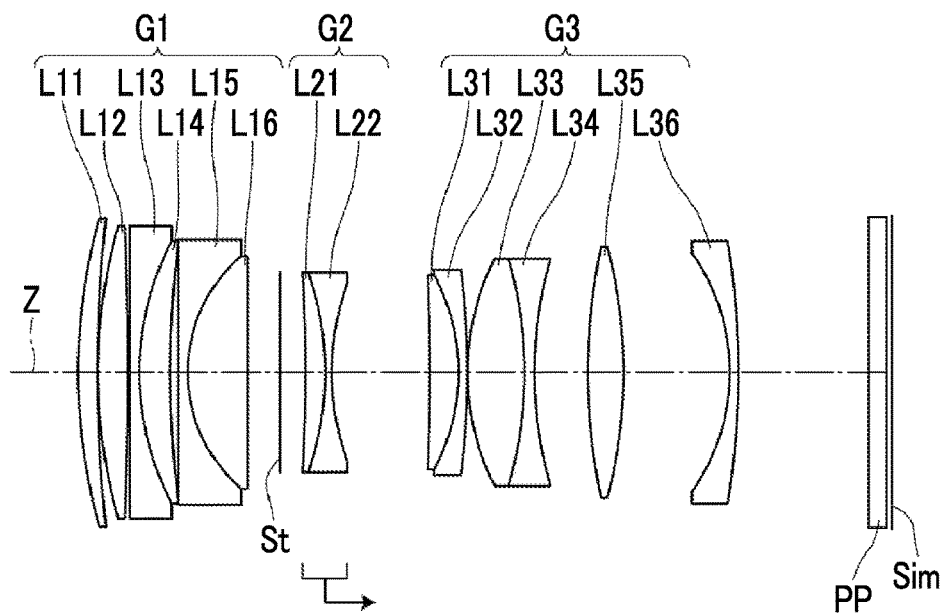
FIG. 3 is a cross-sectional view illustrating a lens configuration of an imaging lens of Example 2 of the present invention.
Figure 13:
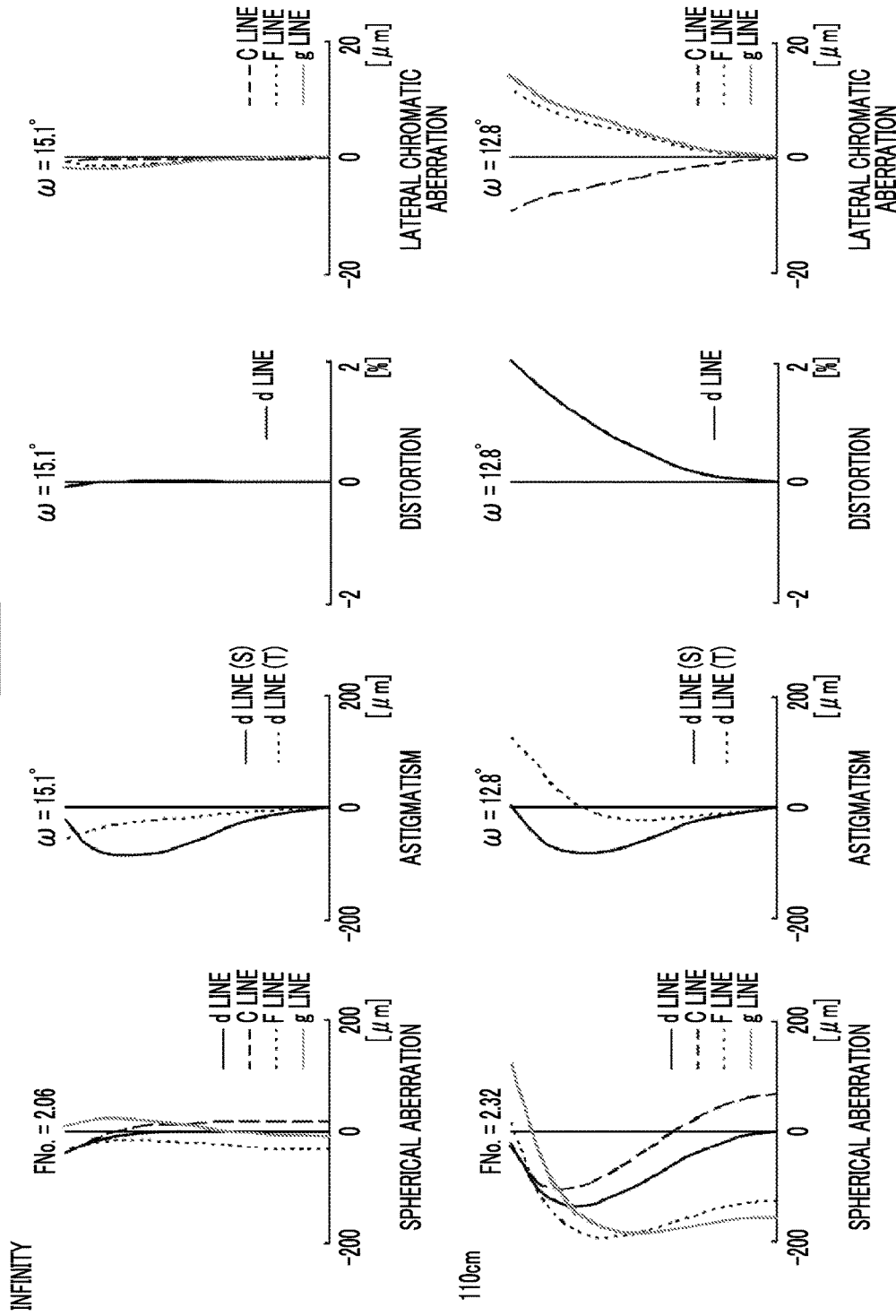
FIG. 13 is a diagram of aberrations of the imaging lens of Example 2 of the present invention.

Next, an imaging lens of Example 2 will be described. FIG. 3 is a cross-sectional diagram illustrating a configuration of the imaging lens of Example 2. The imaging lens of Example 2 has the same lens groups and has the same number of lenses as that of Example 1. Table 4 shows lens data of the imaging lens of Example 2, Table 5 shows data about specification, and Table 6 shows data about moved surface spacings. FIG. 13 shows a diagram of aberrations thereof.

TABLE 4

Example 2•Lens Data

| Si | Ri | Di | Ndj | vdj |
|---|---|---|---|---|
| 1 | 106.3848 | 3.5384 | 1.95375 | 32.32 |
| 2 | 265.6927 | 0.1000 | | |
| 3 | 101.7009 | 5.4244 | 1.55032 | 75.50 |
| 4 | −630.1370 | 0.3749 | | |
| 5 | ∞ | 1.7116 | 1.56732 | 42.82 |
| 6 | 52.8020 | 5.6122 | 1.88300 | 39.22 |
| 7 | 199.7038 | 1.4361 | | |
| 8 | ∞ | 1.7023 | 1.60342 | 38.03 |
| 9 | 28.8426 | 10.8019 | 1.55032 | 75.50 |
| 10 | ∞ | 5.9340 | | |
| 11 (Stop) | ∞ | DD[11] | | |
| 12 | −327.2908 | 3.5884 | 1.84666 | 23.88 |
| 13 | −56.2879 | 1.2056 | 1.78800 | 47.37 |
| 14 | 49.3882 | DD[14] | | |
| 15 | −438.1328 | 5.2541 | 1.55032 | 75.50 |
| 16 | −37.9595 | 1.5318 | 1.61293 | 37.01 |
| 17 | −154.6615 | 0.1000 | | |
| 18 | 48.3799 | 10.1945 | 1.59282 | 68.62 |
| 19 | −77.7556 | 1.8396 | 1.78470 | 26.29 |
| 20 | 77.7556 | 9.6988 | | |
| 21 | 114.3439 | 6.4986 | 2.00100 | 29.13 |
| 22 | −92.0720 | 19.3196 | | |
| 23 | −38.6067 | 1.5176 | 1.51680 | 64.20 |
| 24 | −155.0998 | 23.7721 | | |
| 25 | ∞ | 3.2000 | 1.51680 | 64.20 |
| 26 | ∞ | 1.0212 | | |

TABLE 5

Example 2•Specification

| f | 107.27 |
|---|---|
| BF | 26.90 |

TABLE 5-continued

Example 2•Specification

| FNo. | 2.06 |
|---|---|
| 2ω [°] | 30.2 |

TABLE 6

Example 2•Moved Surface Spacing

| | Infinity | 110 cm |
|---|---|---|
| DD[11] | 4.5904 | 13.06 |
| DD[14] | 17.8292 | 9.35 |

Figure 4:
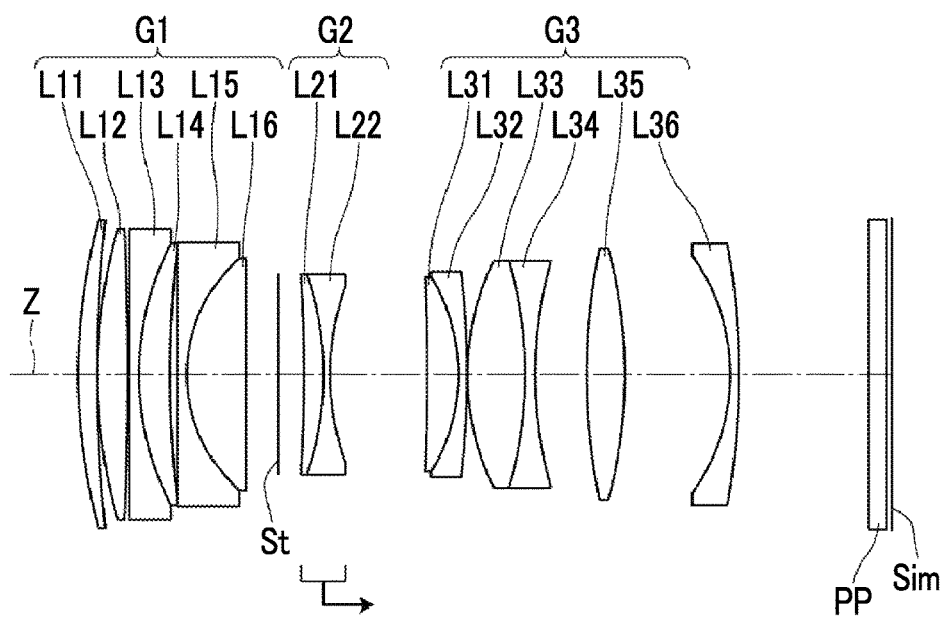
FIG. 4 is a cross-sectional view illustrating a lens configuration of an imaging lens of Example 3 of the present invention.
Figure 14:
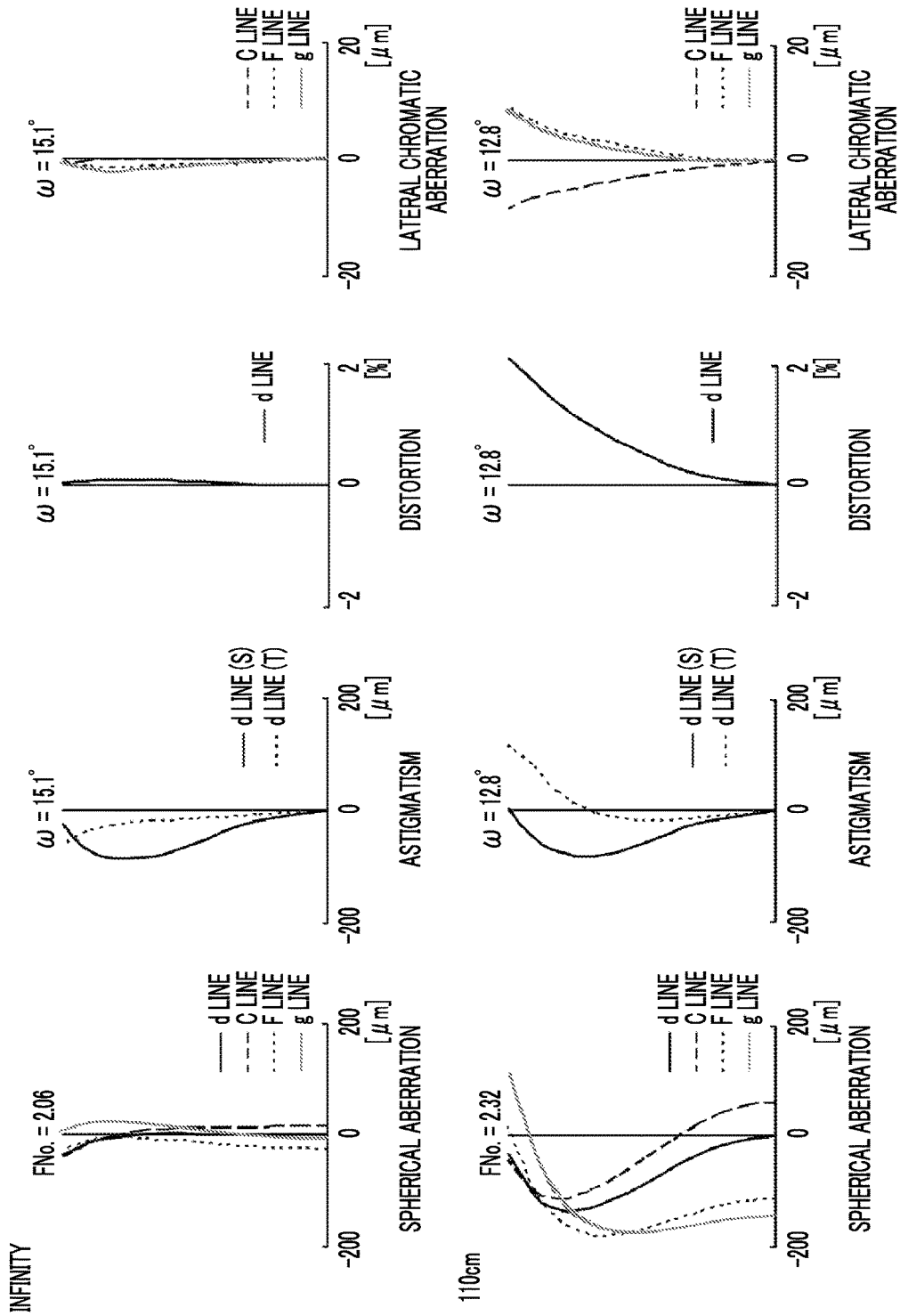
FIG. 14 is a diagram of aberrations of the imaging lens of Example 3 of the present invention.

Next, an imaging lens of Example 3 will be described. FIG. 4 is a cross-sectional diagram illustrating a configuration of the imaging lens of Example 3. The imaging lens of Example 3 has the same lens groups and has the same number of lenses as that of Example 1. Table 7 shows lens data of the imaging lens of Example 3, Table 8 shows data about specification, and Table 9 shows data about moved surface spacings. FIG. 14 shows a diagram of aberrations thereof.

TABLE 7

Example 3•Lens Data

| Si | Ri | Di | Ndj | vdj |
|---|---|---|---|---|
| 1 | 110.1353 | 3.4495 | 1.95375 | 32.32 |
| 2 | 265.6927 | 0.1000 | | |
| 3 | 99.4077 | 5.5109 | 1.55032 | 75.50 |
| 4 | −630.1370 | 0.3633 | | |
| 5 | ∞ | 1.7116 | 1.56732 | 42.82 |
| 6 | 52.9064 | 5.6714 | 1.88300 | 39.22 |
| 7 | 211.7495 | 1.3537 | | |
| 8 | ∞ | 1.7018 | 1.60342 | 38.03 |
| 9 | 28.9785 | 10.7364 | 1.55032 | 75.50 |
| 10 | ∞ | 5.9336 | | |
| 11 (Stop) | ∞ | DD[11] | | |
| 12 | −307.9404 | 3.5884 | 1.85896 | 22.73 |
| 13 | −57.5212 | 1.2056 | 1.78800 | 47.37 |
| 14 | 49.4170 | DD[14] | | |
| 15 | −438.0952 | 5.7397 | 1.55032 | 75.50 |
| 16 | −34.7529 | 1.5321 | 1.61293 | 37.01 |
| 17 | −161.1969 | 0.1000 | | |
| 18 | 48.7483 | 10.4064 | 1.59282 | 68.62 |
| 19 | −76.6654 | 1.8400 | 1.76182 | 26.52 |
| 20 | 76.6654 | 9.4094 | | |
| 21 | 115.1430 | 6.9920 | 2.00100 | 29.13 |
| 22 | −92.0934 | 19.3196 | | |
| 23 | −38.2519 | 1.5635 | 1.51680 | 64.20 |
| 24 | −140.3347 | 23.8233 | | |
| 25 | ∞ | 3.2000 | 1.51680 | 64.20 |
| 26 | ∞ | 1.0178 | | |

TABLE 8

Example 3•Specification

| f | 106.94 |
|---|---|
| BF | 26.95 |
| FNo. | 2.06 |
| 2ω [°] | 30.2 |

TABLE 9

Example 3•Moved Surface Spacing

|  | Infinity | 110 cm |
|---|---|---|
| DD[11] | 4.6727 | 13.12 |
| DD[14] | 17.7604 | 9.31 |

Figure 5:
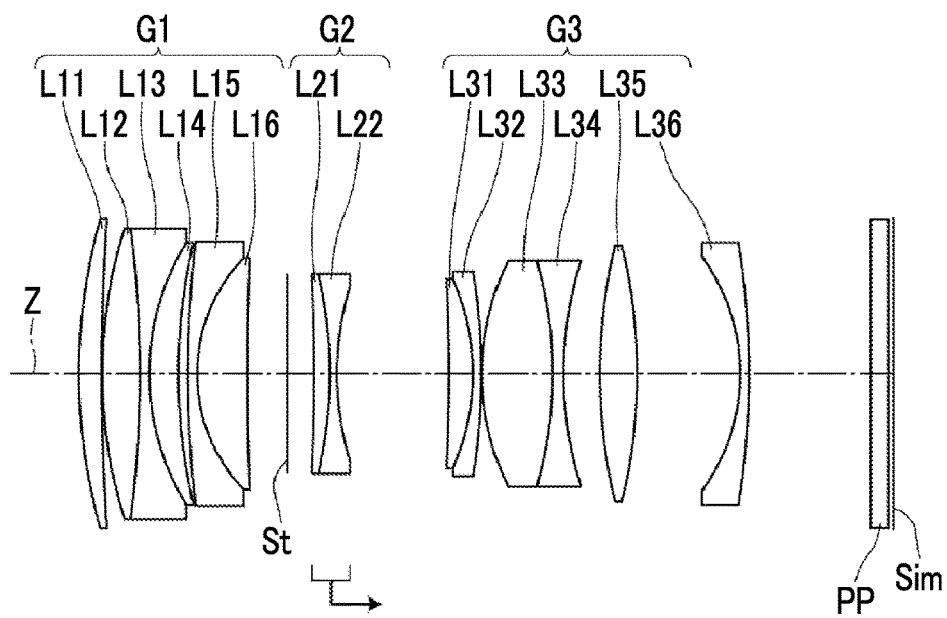
FIG. 5 is a cross-sectional view illustrating a lens configuration of an imaging lens of Example 4 of the present invention.
Figure 15:
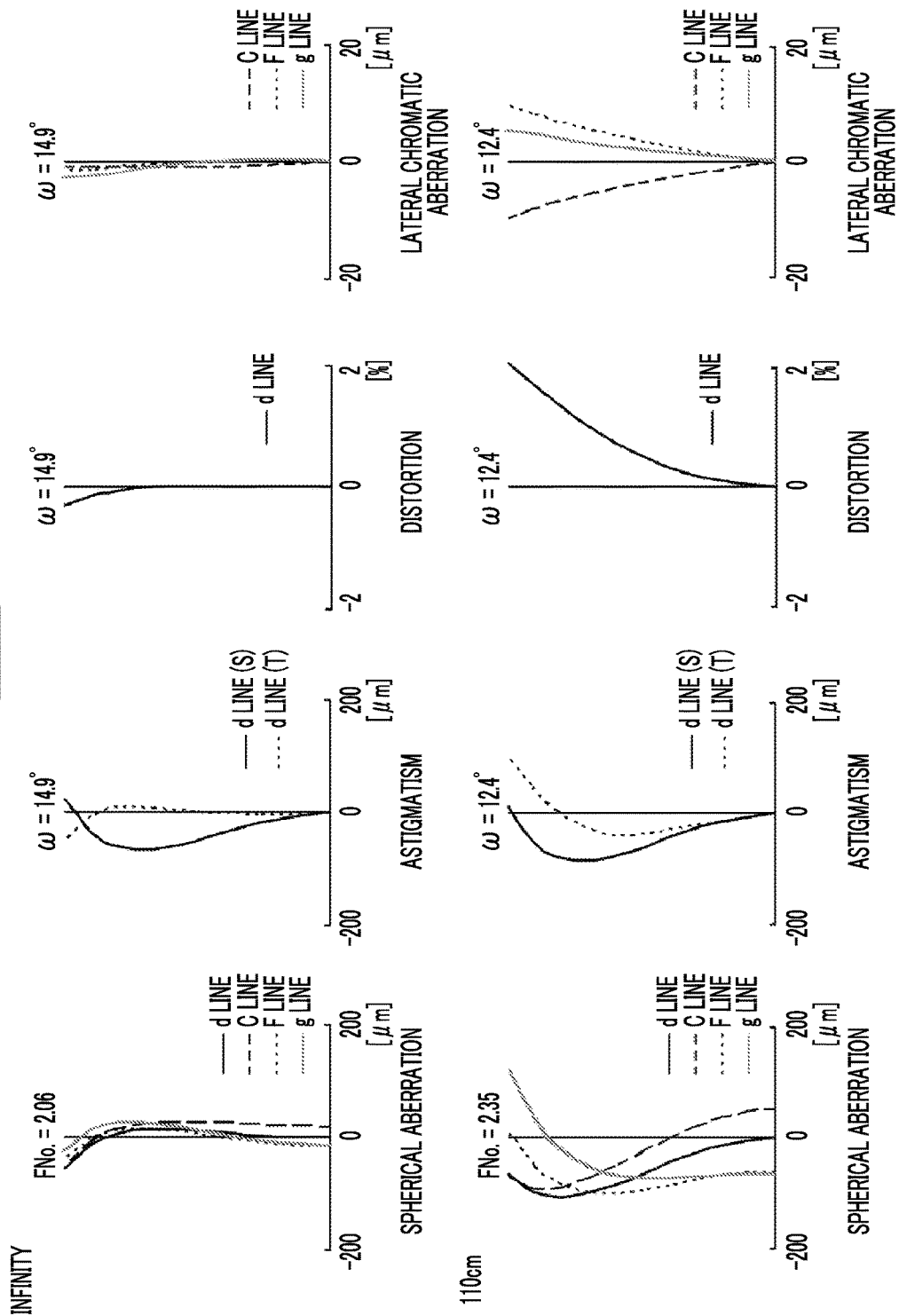
FIG. 15 is a diagram of aberrations of the imaging lens of Example 4 of the present invention.

Next, an imaging lens of Example 4 will be described. FIG. 5 is a cross-sectional diagram illustrating a configuration of the imaging lens of Example 4. The imaging lens of Example 4 has a configuration having the same number of lens groups and the same number of lenses as those of Example 1 except that the lens L12, the lens L13, and the lens L14 are cemented lenses in the first lens group G1. Table 10 shows lens data of the imaging lens of Example 4, Table 11 shows data about specification, and Table 12 shows data about moved surface spacings. FIG. 15 shows a diagram of aberrations thereof.

TABLE 10

Example 4•Lens Data

| Si | Ri | Di | Ndj | vdj |
|---|---|---|---|---|
| 1 | 107.3080 | 4.1739 | 1.95375 | 32.32 |
| 2 | 456.5514 | 0.0916 | | |
| 3 | 91.2967 | 6.8951 | 1.53775 | 74.70 |
| 4 | −213.6548 | 1.7216 | 1.56732 | 42.82 |
| 5 | 47.0462 | 5.3074 | 1.88300 | 40.76 |
| 6 | 109.2640 | 1.7362 | | |
| 7 | 211.7188 | 1.7016 | 1.63980 | 34.47 |
| 8 | 31.7422 | 9.0693 | 1.53775 | 74.70 |
| 9 | 537.2566 | 7.3712 | | |
| 10 (Stop) | ∞ | DD[10] | | |
| 11 | −461.3564 | 2.8696 | 1.95906 | 17.47 |
| 12 | −82.1465 | 1.2980 | 1.85150 | 40.78 |
| 13 | 54.5189 | DD[13] | | |
| 14 | −356.0335 | 4.4264 | 1.53775 | 74.70 |
| 15 | −43.5657 | 1.5410 | 1.68893 | 31.07 |
| 16 | −121.0697 | 0.0457 | | |
| 17 | 47.6863 | 12.8904 | 1.59522 | 67.73 |
| 18 | −76.6387 | 1.9783 | 1.72825 | 28.46 |
| 19 | 69.6963 | 6.6427 | | |
| 20 | 101.0643 | 6.8080 | 2.00100 | 29.13 |
| 21 | −103.6279 | 18.9064 | | |
| 22 | −37.0799 | 1.6096 | 1.51680 | 64.20 |
| 23 | −152.7629 | 22.3000 | | |
| 24 | ∞ | 3.2000 | 1.51680 | 64.20 |
| 25 | ∞ | 1.0160 | | |

TABLE 11

Example 4•Specification

| f | 108.71 |
|---|---|
| BF | 25.43 |
| FNo. | 2.06 |
| 2ω [°] | 29.8 |

TABLE 12

Example 4•Moved Surface Spacing

|  | Infinity | 110 cm |
|---|---|---|
| DD[10] | 4.8321 | 14.94 |
| DD[13] | 20.4938 | 10.38 |

Figure 6:
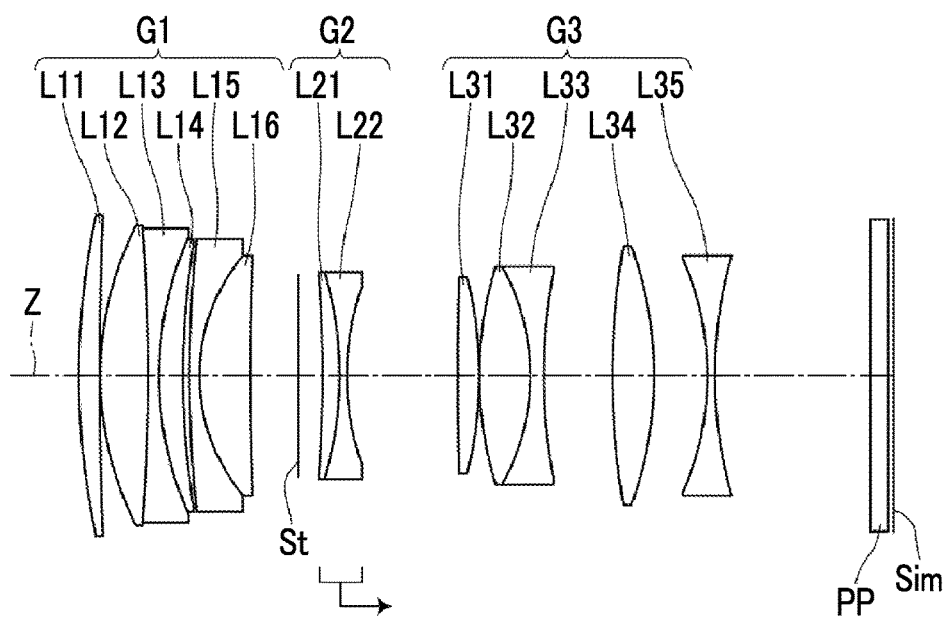
FIG. 6 is a cross-sectional view illustrating a lens configuration of an imaging lens of Example 5 of the present invention.
Figure 16:
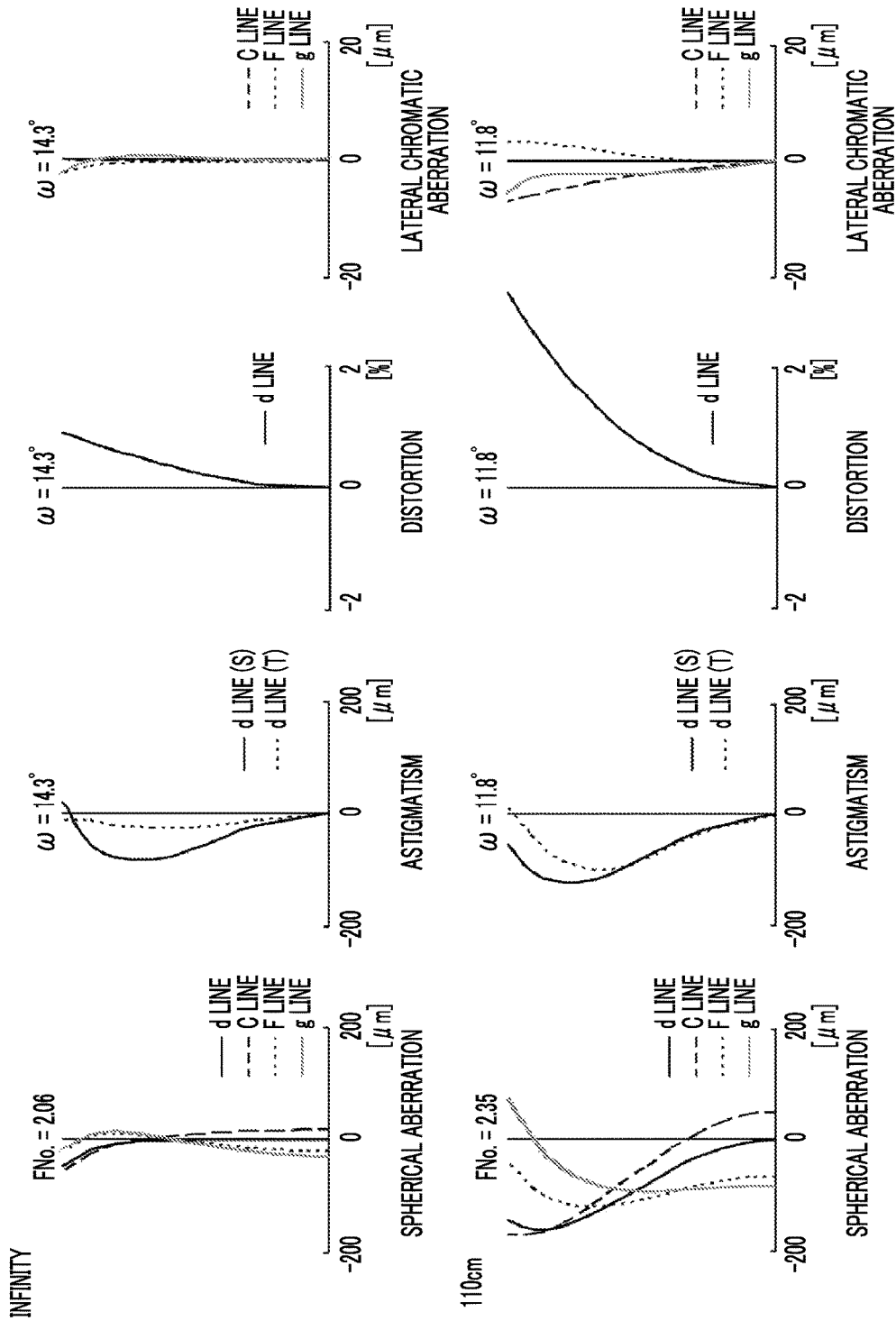
FIG. 16 is a diagram of aberrations of the imaging lens of Example 5 of the present invention.

Next, an imaging lens of Example 5 will be described. FIG. 6 is a cross-sectional diagram illustrating a configuration of the imaging lens of Example 5. The imaging lens of Example 5 has a configuration having the same number of lens groups and the same number of lenses as those of Example 1 except that the lens L12, the lens L13, and the lens L14 are cemented lenses in the first lens group G1, the third lens group G3 includes five lenses including the lenses L31 to L35 in order from the object side, and the lens L32 and the lens L33 are cemented lenses. Table 13 shows lens data of the imaging lens of Example 5, Table 14 shows data about specification, and Table 15 shows data about moved surface spacings. FIG. 16 shows a diagram of aberrations thereof.

TABLE 13

Example 5•Lens Data

| Si | Ri | Di | Ndj | vdj |
|---|---|---|---|---|
| 1 | 142.9591 | 3.7479 | 1.90200 | 25.26 |
| 2 | 760.5207 | 0.0964 | | |
| 3 | 61.8323 | 8.6559 | 1.59522 | 67.73 |
| 4 | −361.3655 | 1.9419 | 1.66998 | 39.27 |
| 5 | 63.4768 | 4.2987 | 1.88300 | 40.76 |
| 6 | 150.7495 | 1.1994 | | |
| 7 | 245.7159 | 1.7872 | 1.66680 | 33.05 |
| 8 | 35.2319 | 9.0394 | 1.53775 | 74.70 |
| 9 | 579.1724 | 8.6944 | | |
| 10 (Stop) | ∞ | DD[10] | | |
| 11 | −248.4832 | 3.0912 | 1.95906 | 17.47 |
| 12 | −68.2000 | 1.3140 | 1.79952 | 42.22 |
| 13 | 50.5647 | DD[13] | | |
| 14 | 636.5031 | 3.8644 | 1.53775 | 74.70 |
| 15 | −77.7425 | 0.0480 | | |
| 16 | 68.9992 | 9.0855 | 1.61800 | 63.33 |
| 17 | −41.8764 | 2.4150 | 1.78472 | 25.68 |
| 18 | 102.7659 | 12.4147 | | |
| 19 | 145.6695 | 7.4869 | 2.00100 | 29.13 |
| 20 | −70.9468 | 9.6024 | | |
| 21 | −54.3420 | 1.4004 | 1.51633 | 64.06 |
| 22 | 82.3881 | 28.0562 | | |
| 23 | ∞ | 3.2000 | 1.51680 | 64.20 |
| 24 | ∞ | 1.0158 | | |

TABLE 14

Example 5•Specification

| f | 112.52 |
|---|---|
| BF | 31.18 |
| FNo. | 2.06 |
| 2ω [°] | 28.6 |

TABLE 15

Example 5•Moved Surface Spacing

|  | Infinity | 110 cm |
|---|---|---|
| DD[10] | 4.3466 | 13.99 |
| DD[13] | 19.9748 | 10.33 |

Figure 7:
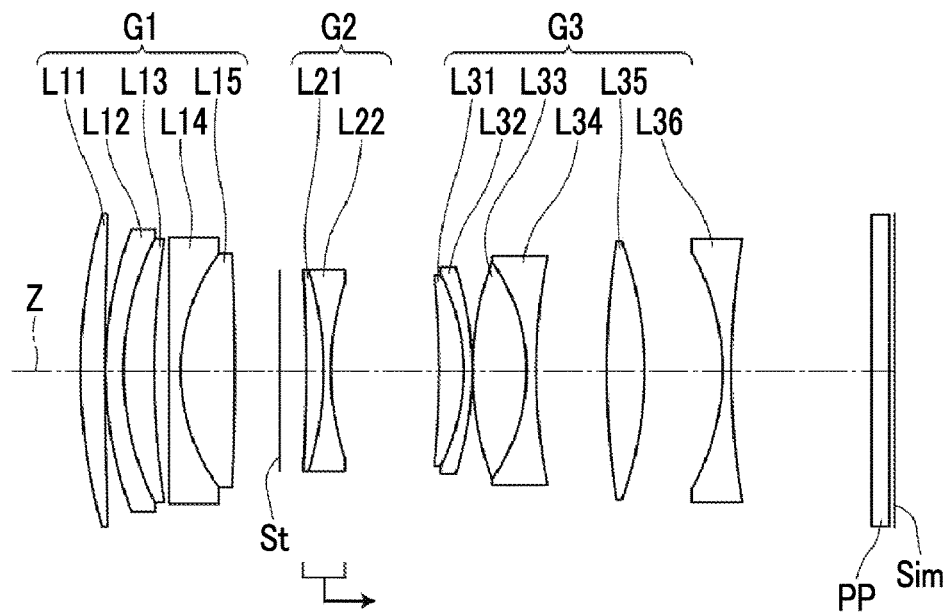
FIG. 7 is a cross-sectional view illustrating a lens configuration of an imaging lens of Example 6 of the present invention.
Figure 17:
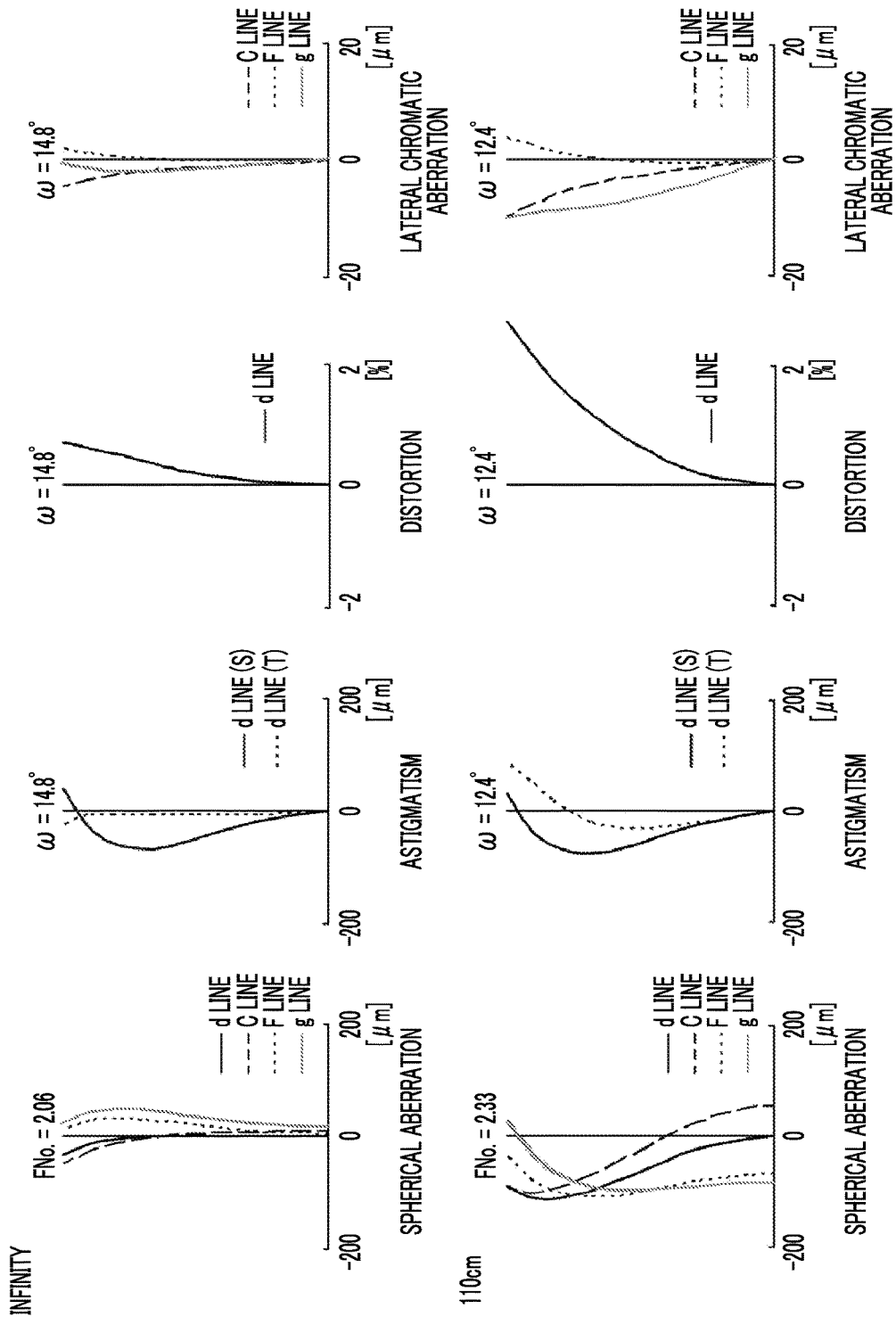
FIG. 17 is a diagram of aberrations of the imaging lens of Example 6 of the present invention.

Next, an imaging lens of Example 6 will be described. FIG. 7 is a cross-sectional diagram illustrating a configuration of the imaging lens of Example 6. The imaging lens of Example 6 has a configuration having the same number of lens groups and the same number of lenses as those of Example 1 except that the first lens group G1 includes five lenses including the lenses L11 to L15 in order from the object side and the lens L12, the lens L13, the lens L14, and the lens L15 are cemented lenses. Table 16 shows lens data of the imaging lens of Example 6, Table 17 shows data about specification, and Table 18 shows data about moved surface spacings. FIG. 17 shows a diagram of aberrations thereof.

TABLE 16

Example 6•Lens Data

| Si | Ri | Di | Ndj | vdj |
|---|---|---|---|---|
| 1 | 109.6984 | 4.4102 | 1.88300 | 40.76 |
| 2 | 732.2274 | 0.0916 | | |
| 3 | 74.5741 | 3.2300 | 1.51680 | 64.20 |
| 4 | 54.8374 | 5.5204 | 1.72366 | 55.32 |
| 5 | 154.0016 | 2.6253 | | |
| 6 | 9667.1715 | 2.1762 | 1.62992 | 35.01 |
| 7 | 36.7805 | 9.6345 | 1.53775 | 74.70 |
| 8 | −617.5831 | 8.1424 | | |
| 9 (Stop) | ∞ | DD [9] | | |
| 10 | −302.0827 | 3.1284 | 1.95906 | 17.47 |
| 11 | −64.3972 | 1.2980 | 1.85150 | 40.78 |
| 12 | 51.2655 | DD [12] | | |
| 13 | −165.7340 | 4.4260 | 1.53775 | 74.70 |
| 14 | −39.0710 | 1.5407 | 1.68893 | 31.07 |
| 15 | −61.1346 | 0.0457 | | |
| 16 | 57.8453 | 9.6696 | 1.59522 | 67.73 |
| 17 | −35.6863 | 1.7485 | 1.72825 | 28.46 |
| 18 | 109.5262 | 12.7700 | | |
| 19 | 166.2597 | 6.8084 | 2.00100 | 29.13 |
| 20 | −70.0666 | 14.0757 | | |
| 21 | −45.1738 | 1.6096 | 1.51680 | 64.20 |
| 22 | 148.8755 | 25.3489 | | |
| 23 | ∞ | 3.2000 | 1.51680 | 64.20 |
| 24 | ∞ | 1.0110 | | |

TABLE 17

Example 6•Specification

| f | 108.45 |
|---|---|
| BF | 28.47 |
| FNo. | 2.06 |
| 2ω [°] | 29.6 |

TABLE 18

Example 6•Moved Surface Spacing

| | Infinity | 110 cm |
|---|---|---|
| DD [9] | 4.8056 | 13.32035 |
| DD [12] | 19.5936 | 11.0788 |

Figure 8:
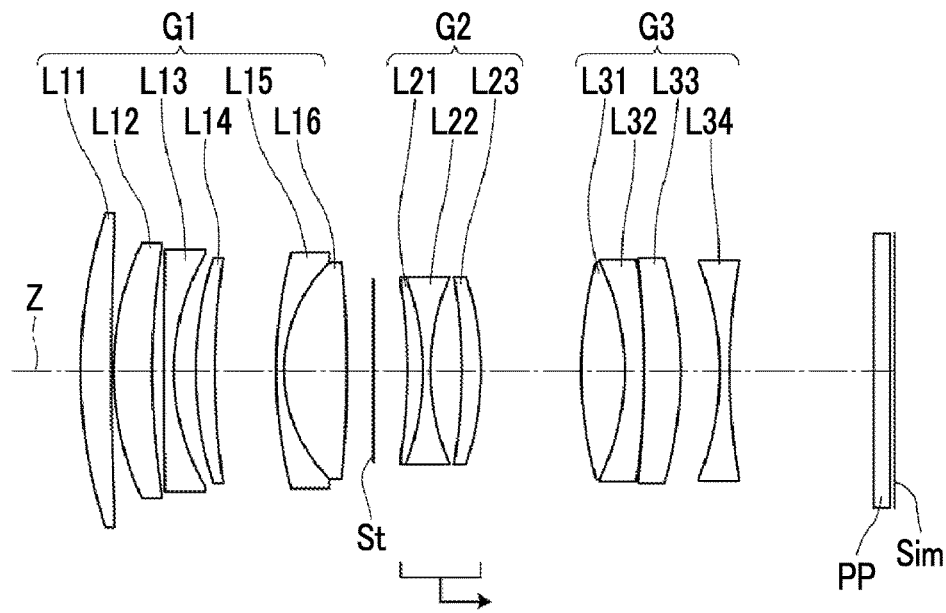
FIG. 8 is a cross-sectional view illustrating a lens configuration of an imaging lens of Example 7 of the present invention.
Figure 18:
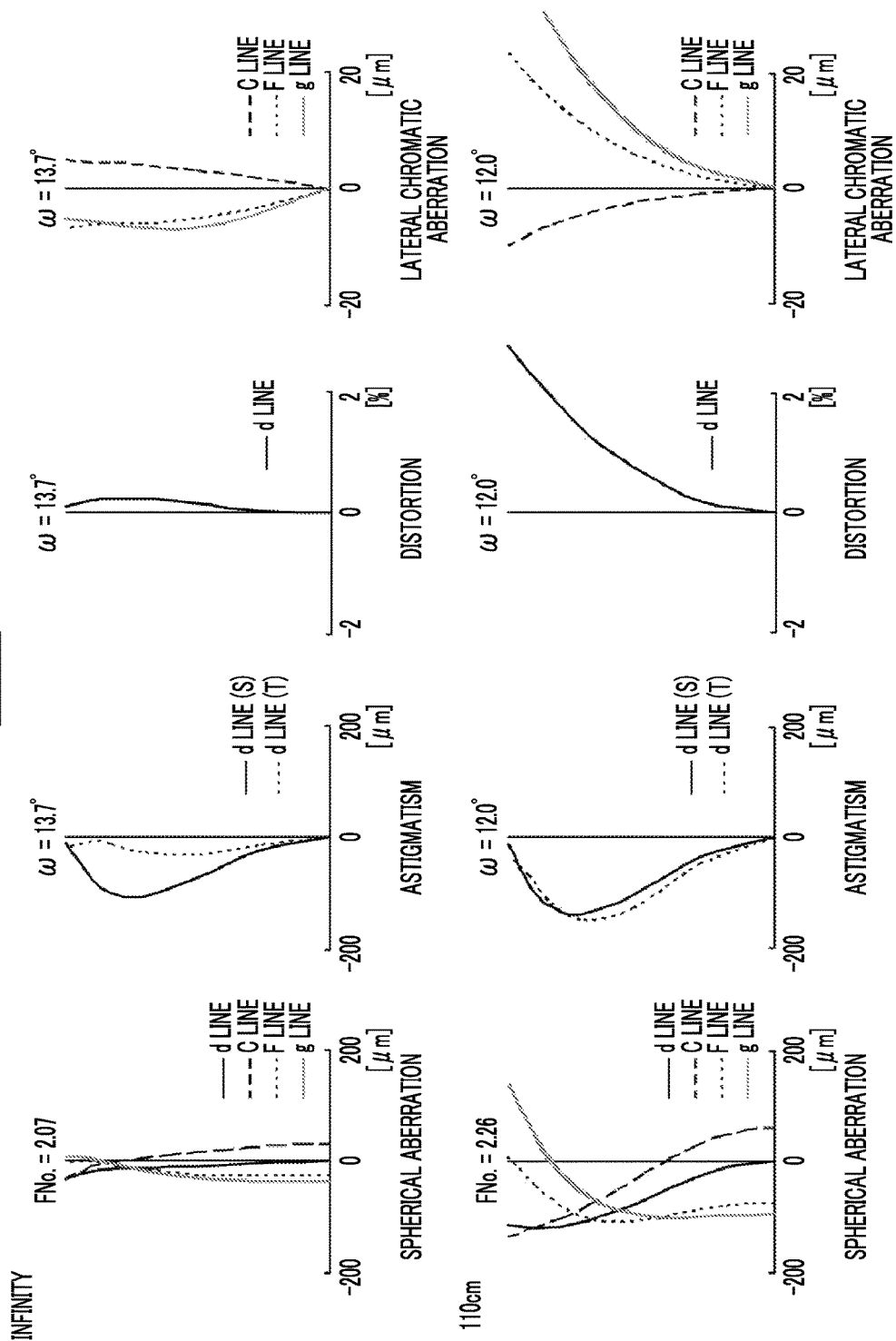
FIG. 18 is a diagram of aberrations of the imaging lens of Example 7 of the present invention.

Next, an imaging lens of Example 7 will be described. FIG. 8 is a cross-sectional diagram illustrating a configuration of the imaging lens of Example 7. The imaging lens of Example 7 has a configuration having the same number of lens groups and the same number of lenses as those of Example 1 except that only the lens L15 and the lens L16 are cemented lenses in the first lens group G1, the second lens group G2 includes three lenses including the lenses L21 to L23 in order from the object side, the lens L21 and the lens L22 are cemented lenses, the third lens group G3 includes four lenses including the lenses L31 to L34 in order from the object side, and the lens L31 and the lens L32 are cemented lenses. Table 19 shows lens data of the imaging lens of Example 7, Table 20 shows data about specification, and Table 21 shows data about moved surface spacings. FIG. 18 shows a diagram of aberrations thereof

TABLE 19

Example 7•Lens Data

| Si | Ri | Di | Ndj | vdj |
|---|---|---|---|---|
| 1 | 104.6453 | 6.0955 | 1.94000 | 28.45 |
| 2 | 650.9586 | 0.4826 | | |
| 3 | 62.2091 | 7.7235 | 1.49700 | 81.61 |
| 4 | 161.7608 | 2.4154 | | |
| 5 | 1867.0558 | 1.9316 | 1.69654 | 30.25 |
| 6 | 47.5915 | 4.3474 | | |
| 7 | 75.9174 | 3.8636 | 1.49700 | 81.61 |
| 8 | 160.1419 | 12.0754 | | |
| 9 | 95.0491 | 1.6043 | 1.57116 | 41.66 |
| 10 | 31.1001 | 12.5690 | 1.61800 | 63.33 |
| 11 | −240.9588 | 5.3126 | | |
| 12 (Stop) | ∞ | DD [12] | | |
| 13 | −116.0939 | 3.1390 | 1.95906 | 17.47 |
| 14 | −54.2720 | 1.4586 | 1.70197 | 35.65 |
| 15 | 48.4916 | 6.2791 | | |
| 16 | −118.0709 | 3.8644 | 1.49700 | 81.61 |
| 17 | −62.1677 | DD [17] | | |
| 18 | 83.7890 | 8.6940 | 1.79065 | 48.94 |
| 19 | −50.9544 | 3.8744 | 1.72177 | 28.91 |
| 20 | −161.0091 | 0.0479 | | |
| 21 | −199.5179 | 7.2454 | 1.90486 | 37.51 |
| 22 | −81.9311 | 7.8732 | | |
| 23 | −58.8558 | 1.9799 | 1.55999 | 43.75 |
| 24 | 133.3033 | 28.8163 | | |
| 25 | ∞ | 3.2000 | 1.51680 | 64.20 |
| 26 | ∞ | 1.0189 | | |

TABLE 20

Example 7•Specification

| f | 114.50 |
|---|---|
| BF | 31.94 |
| FNo. | 2.07 |
| 2ω [°] | 27.4 |

TABLE 21

Example 7•Moved Surface Spacing

| | Infinity | 110 cm |
|---|---|---|
| DD [12] | 6.7620 | 16.84869 |
| DD [17] | 19.9080 | 9.821345 |

Figure 9:
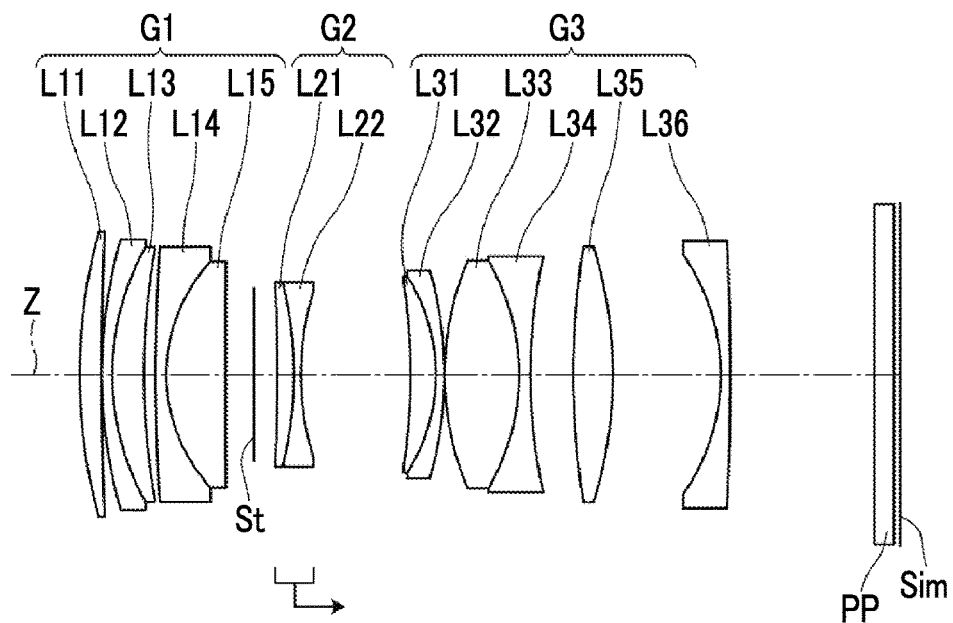
FIG. 9 is a cross-sectional view illustrating a lens configuration of an imaging lens of Example 8 of the present invention.
Figure 19:
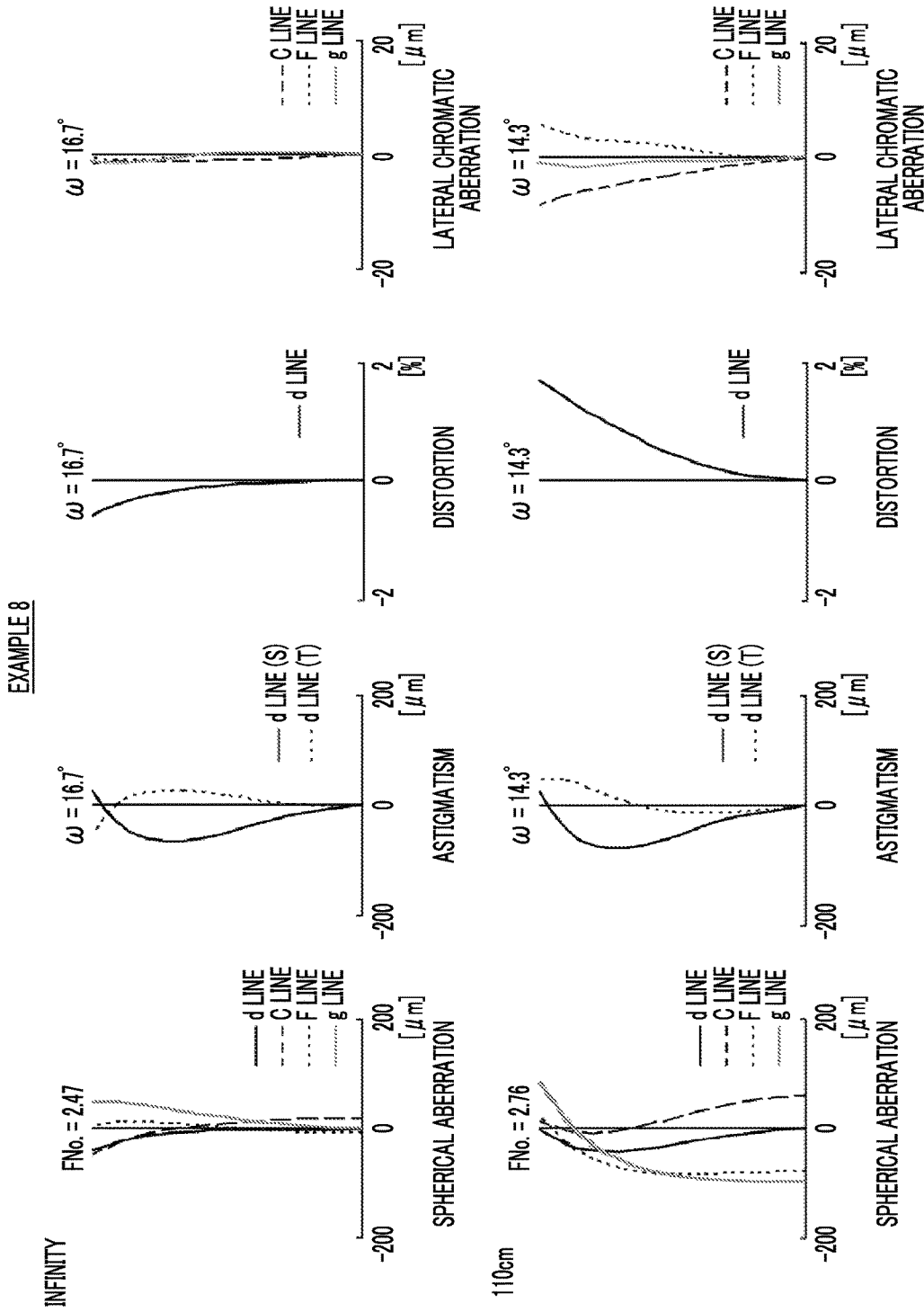
FIG. 19 is a diagram of aberrations of the imaging lens of Example 8 of the present invention.

Next, an imaging lens of Example 8 will be described. FIG. 9 is a cross-sectional diagram illustrating a configuration of the imaging lens of Example 8. The imaging lens of Example 8 has a configuration having the same number of lens groups and the same number of lenses as those of Example 1 except that the first lens group G1 includes five lenses including the lenses L11 to L15 in order from the object side and the lens L12, the lens L13, the lens L14, and the lens L15 are cemented lenses. Table 22 shows lens data of the imaging lens of Example 8, Table 23 shows data about specification, and Table 24 shows data about moved surface spacings. FIG. 19 shows a diagram of aberrations thereof.

TABLE 22

Example 8•Lens Data

| Si | Ri | Di | Ndj | vdj |
|---|---|---|---|---|
| 1 | 92.0791 | 3.6536 | 1.75500 | 52.32 |
| 2 | 582.1007 | 0.0090 | | |
| 3 | 84.2893 | 1.7494 | 1.51680 | 64.20 |

TABLE 22-continued

Example 8•Lens Data

| Si | Ri | Di | Ndj | vdj |
|---|---|---|---|---|
| 4 | 44.6695 | 5.2204 | 1.88300 | 40.76 |
| 5 | 121.3438 | 1.9515 | | |
| 6 | 351.0534 | 1.7839 | 1.63980 | 34.47 |
| 7 | 28.4561 | 9.7577 | 1.53775 | 74.70 |
| 8 | 7722.3452 | 4.5671 | | |
| 9 (Stop) | ∞ | DD [9] | | |
| 10 | −332.6098 | 2.7206 | 1.95906 | 17.47 |
| 11 | −65.0147 | 1.1831 | 1.85150 | 40.78 |
| 12 | 48.9277 | DD [12] | | |
| 13 | −106.6363 | 4.1847 | 1.53775 | 74.70 |
| 14 | −31.3357 | 1.4351 | 1.68893 | 31.07 |
| 15 | −63.8641 | 0.0433 | | |
| 16 | 50.0226 | 12.1894 | 1.59522 | 67.73 |
| 17 | −39.3280 | 1.8709 | 1.72151 | 29.23 |
| 18 | 94.1394 | 7.1162 | | |
| 19 | 142.3173 | 6.5254 | 2.00100 | 29.13 |
| 20 | −72.9233 | 17.8346 | | |
| 21 | −35.7443 | 1.5526 | 1.48749 | 70.24 |
| 22 | −499.7198 | 23.9112 | | |
| 23 | ∞ | 3.2000 | 1.51680 | 64.20 |
| 24 | ∞ | 1.0152 | | |

TABLE 23

Example 8•Specification

| | |
|---|---|
| f | 96.69 |
| BF | 27.04 |
| FNo. | 2.47 |
| 2ω [°] | 33.4 |

TABLE 24

Example 8•Moved Surface Spacing

| | Infinity | 110 cm |
|---|---|---|
| DD [9] | 3.9146 | 10.90386 |
| DD [12] | 18.0916 | 11.10233 |

Figure 10:
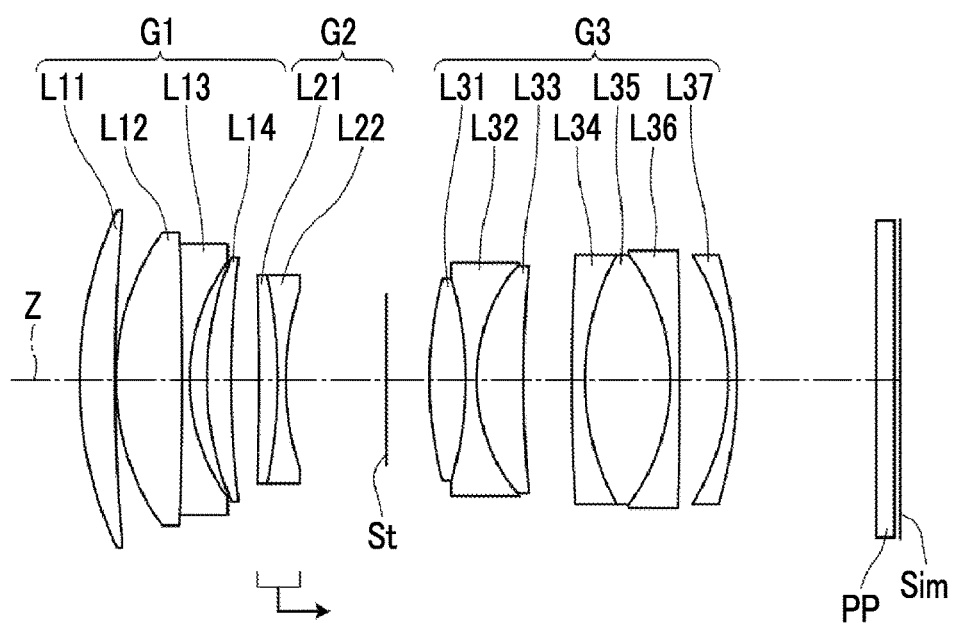
FIG. 10 is a cross-sectional view illustrating a lens configuration of an imaging lens of Example 9 of the present invention.
Figure 20:
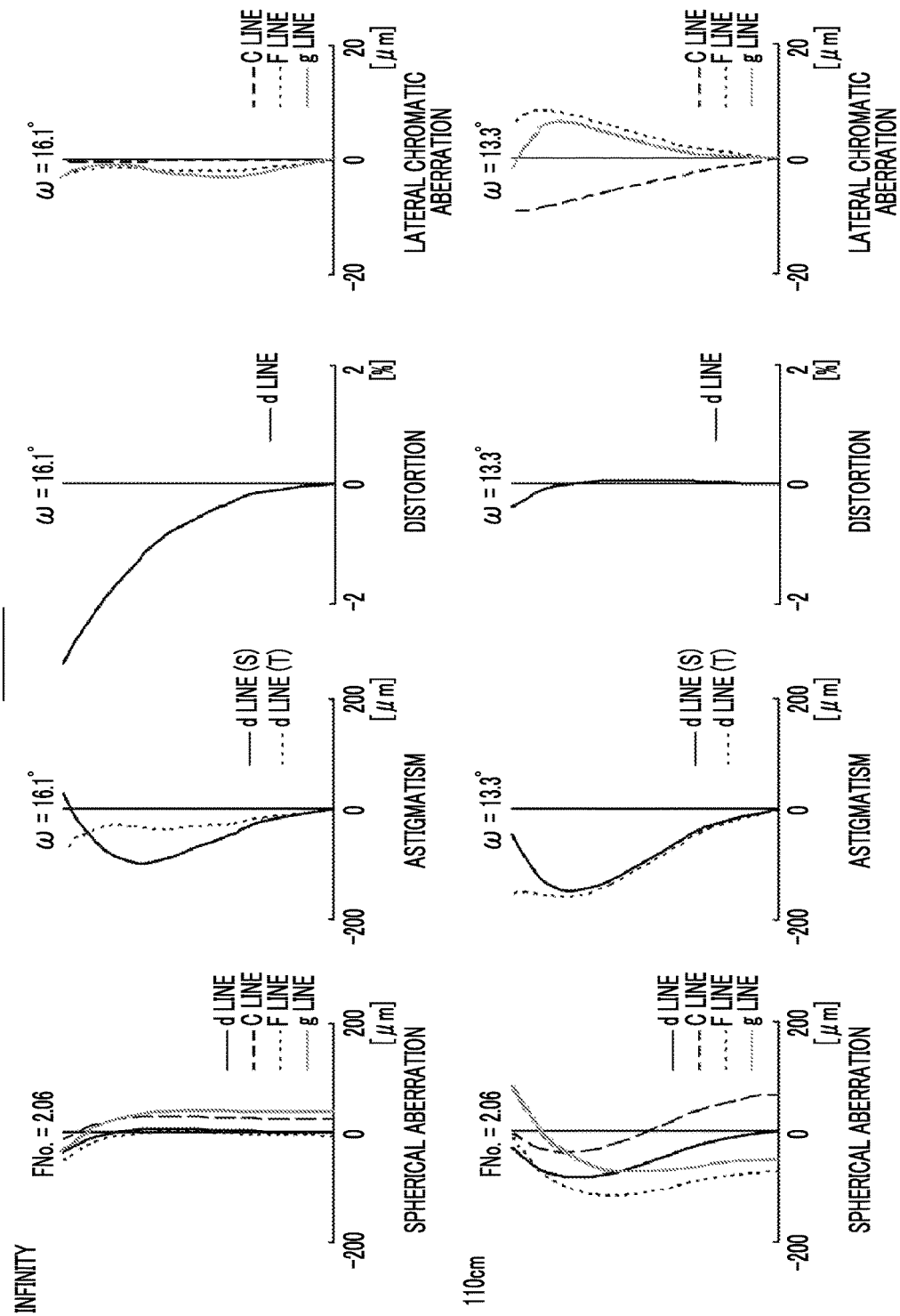
FIG. 20 is a diagram of aberrations of the imaging lens of Example 9 of the present invention.

Next, an imaging lens of Example 9 will be described. FIG. 10 is a cross-sectional diagram illustrating a configuration of the imaging lens of Example 9. The imaging lens of Example 9 has a configuration having the same number of lens groups and the same number of lenses as those of Example 1 except that the first lens group G1 includes four lenses including the lenses L11 to L14 in order from the object side, the lens L12 and the lens L13 are cemented lenses, the third lens group G3 includes seven lenses including the lenses L31 to L37 in order from the object side, the lens L31, the lens L32, the lens L33, the lens L34, the lens L35, and the lens L36 are cemented lenses, and the aperture stop St is disposed between the second lens group G2 and the third lens group G3. Table 25 shows lens data of the imaging lens of Example 9, Table 26 shows data about specification, and Table 27 shows data about moved surface spacings. FIG. 20 shows a diagram of aberrations thereof.

TABLE 25

Example 9•Lens Data

| Si | Ri | Di | Ndj | vdj |
|---|---|---|---|---|
| 1 | 73.0761 | 6.2864 | 1.95375 | 32.32 |
| 2 | 340.6133 | 0.1522 | | |

TABLE 25-continued

Example 9•Lens Data

| Si | Ri | Di | Ndj | vdj |
|---|---|---|---|---|
| 3 | 46.8672 | 11.7949 | 1.53775 | 74.70 |
| 4 | −747.4351 | 1.3297 | 1.71736 | 29.52 |
| 5 | 37.0837 | 3.0563 | | |
| 6 | 58.6171 | 4.1803 | 1.59522 | 67.73 |
| 7 | 181.3674 | DD [7] | | |
| 8 | −553.7538 | 3.3817 | 1.95906 | 17.47 |
| 9 | −89.4862 | 1.3780 | 1.80440 | 39.59 |
| 10 | 53.2208 | DD [10] | | |
| 11 (Stop) | ∞ | 7.6001 | | |
| 12 | 71.9487 | 6.4600 | 1.81600 | 46.62 |
| 13 | −65.7980 | 1.9104 | 1.74077 | 27.79 |
| 14 | 32.9278 | 8.2443 | 1.59522 | 67.73 |
| 15 | 230.5076 | 8.5168 | | |
| 16 | 362.2624 | 2.3568 | 1.67300 | 38.15 |
| 17 | 47.2777 | 15.2004 | 1.95000 | 29.37 |
| 18 | −37.7872 | 1.5681 | 1.67300 | 38.15 |
| 19 | −1146.2603 | 8.7400 | | |
| 20 | −42.1776 | 1.5201 | 1.76182 | 26.52 |
| 21 | −78.1562 | 24.7753 | | |
| 22 | ∞ | 3.2000 | 1.51680 | 64.20 |
| 23 | ∞ | 1.0175 | | |

TABLE 26

Example 9•Specification

| | |
|---|---|
| f | 103.03 |
| BF | 27.90 |
| FNo. | 2.06 |
| 2ω [°] | 32.2 |

TABLE 27

Example 9•Moved Surface Spacing

| | Infinity | 110 cm |
|---|---|---|
| DD [7] | 4.9401 | 14.01378 |
| DD [10] | 17.9196 | 8.8459 |

Figure 11:
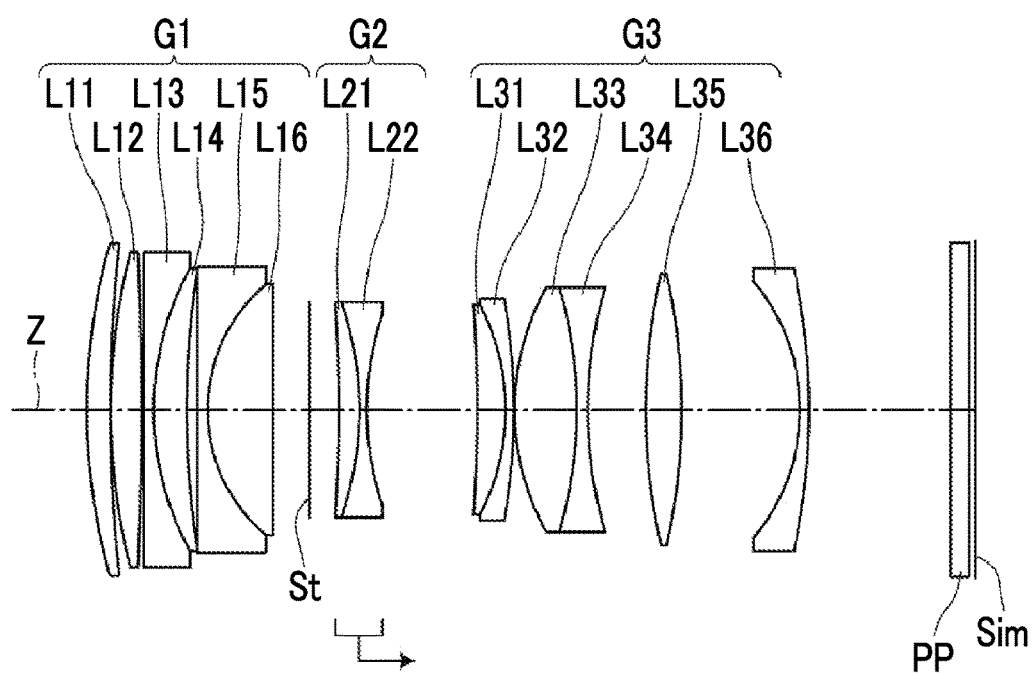
FIG. 11 is a cross-sectional view illustrating a lens configuration of an imaging lens of Example 10 of the present invention.
Figure 21:
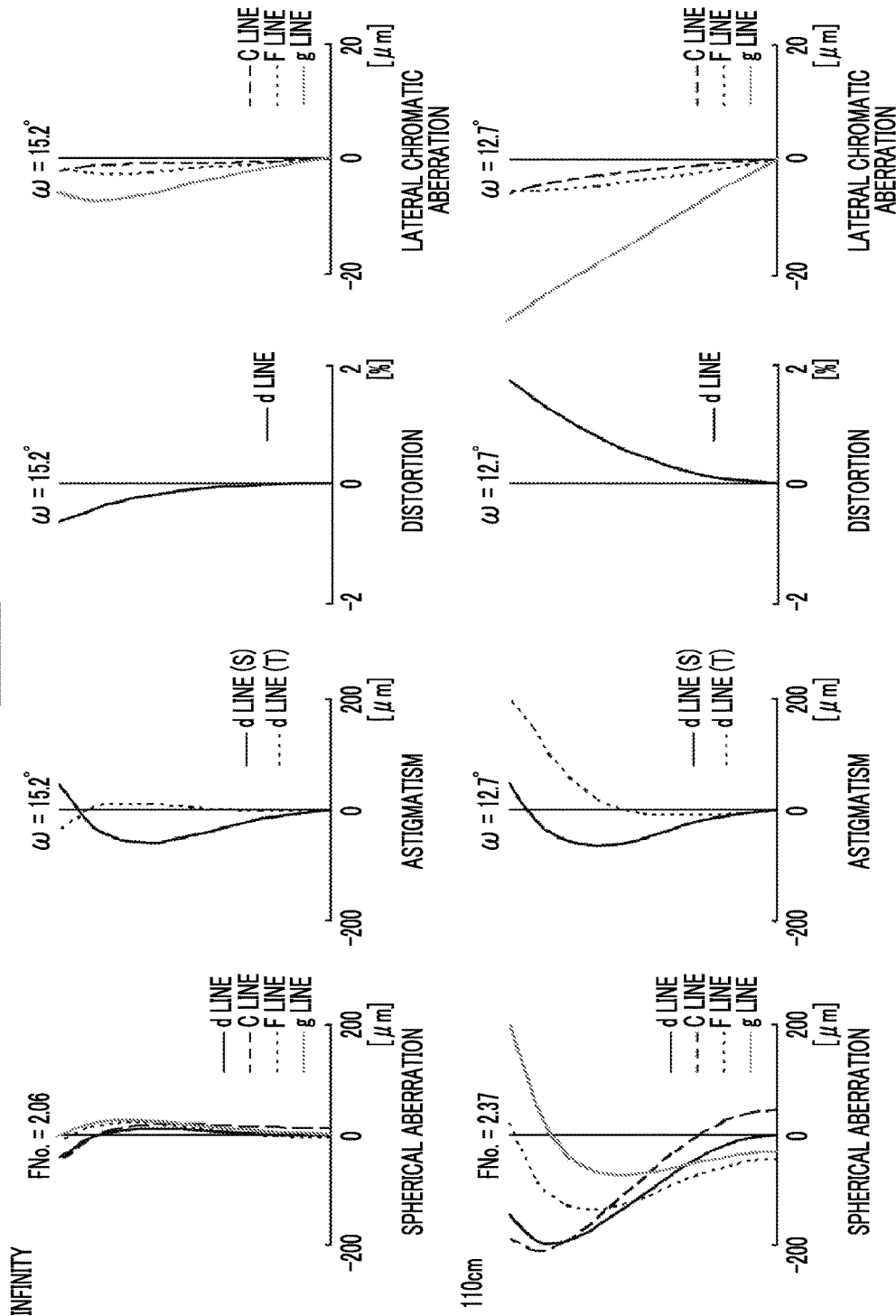
FIG. 21 is a diagram of aberrations of the imaging lens of Example 10 of the present invention.

Next, an imaging lens of Example 10 will be described. FIG. 11 is a cross-sectional diagram illustrating a configuration of the imaging lens of Example 10. The imaging lens of Example 10 has the same lens groups and has the same number of lenses as that of Example 1. Table 28 shows lens data of the imaging lens of Example 10, Table 29 shows data about specification, and Table 30 shows data about moved surface spacings. FIG. 21 shows a diagram of aberrations thereof.

TABLE 28

Example 10•Lens Data

| Si | Ri | Di | Ndj | vdj |
|---|---|---|---|---|
| 1 | 106.5998 | 3.9096 | 1.95375 | 32.32 |
| 2 | 265.6927 | 0.1000 | | |
| 3 | 112.6110 | 5.1274 | 1.60300 | 65.44 |
| 4 | −630.2080 | 0.3656 | | |
| 5 | ∞ | 1.7122 | 1.56732 | 42.82 |
| 6 | 51.4992 | 5.5274 | 1.88300 | 39.22 |
| 7 | 162.4926 | 1.7530 | | |
| 8 | ∞ | 1.7714 | 1.63980 | 34.49 |
| 9 | 28.3591 | 11.0504 | 1.60300 | 65.44 |
| 10 | ∞ | 6.0649 | | |
| 11 (Stop) | ∞ | DD [11] | | |
| 12 | −268.9987 | 3.4340 | 1.95906 | 17.47 |

TABLE 28-continued

Example 10•Lens Data

| Si | Ri | Di | Ndj | vdj |
|---|---|---|---|---|
| 13 | −57.8574 | 1.2286 | 1.85150 | 40.78 |
| 14 | 52.2808 | DD [14] | | |
| 15 | −266.3385 | 4.7808 | 1.55032 | 75.50 |
| 16 | −39.7875 | 1.5316 | 1.68893 | 31.16 |
| 17 | −103.6836 | 0.1000 | | |
| 18 | 44.3141 | 10.4064 | 1.59282 | 68.62 |
| 19 | −76.6672 | 1.8400 | 1.76182 | 26.61 |
| 20 | 76.6672 | 9.7185 | | |
| 21 | 106.0692 | 6.0244 | 2.00100 | 29.13 |
| 22 | −108.3094 | 19.9063 | | |
| 23 | −34.7316 | 1.5636 | 1.51680 | 64.20 |
| 24 | −114.9974 | 23.8507 | | |
| 25 | ∞ | 3.2000 | 1.51680 | 64.20 |
| 26 | ∞ | 1.0201 | | |

TABLE 29

Example 10•Specification

| | |
|---|---|
| f | 106.71 |
| BF | 26.98 |
| FNo. | 2.06 |
| 2ω [°] | 30.4 |

TABLE 30

Example 10•Moved Surface Spacing

| | Infinity | 110 cm |
|---|---|---|
| DD [11] | 4.9771 | 13.89637 |
| DD [14] | 18.5116 | 9.592264 |

Table 31 shows values corresponding to Conditional Expressions (1) to (11) of the imaging lenses of Examples 1 to 10. It should be noted that, in the above-mentioned examples, the d line is set as the reference wavelength, and the values shown in the following Table 31 are values at the reference wavelength.

TABLE 31

| Expression Number | Conditional Expression | Example 1 | Example 2 | Example 3 | Example 4 | Example 5 | Example 6 | Example 7 | Example 8 | Example 9 | Example 10 |
|---|---|---|---|---|---|---|---|---|---|---|---|
| (1) | (R21 + R22)/(R21 − R22) | 1.456 | 1.415 | 1.459 | 1.433 | 1.757 | 1.542 | 2.756 | 1.486 | 1.385 | 1.548 |
| (2) | N2 | 1.954 | 1.954 | 1.954 | 1.954 | 1.902 | 1.883 | 1.940 | 1.755 | 1.954 | 1.959 |
| (3) | v1max | 75.50 | 75.50 | 75.50 | 74.70 | 74.70 | 74.70 | 81.61 | 74.70 | 74.70 | 65.44 |
| (4) | v3max | 75.50 | 75.50 | 75.50 | 74.70 | 74.70 | 74.70 | 81.61 | 74.70 | 67.73 | 75.50 |
| (5) | f/f2 | −1.918 | −1.887 | −1.882 | −1.787 | −1.961 | −1.975 | −2.081 | −1.809 | −1.564 | −1.931 |
| (6) | f/f1 | 1.261 | 1.255 | 1.255 | 1.173 | 1.240 | 1.264 | 1.280 | 1.229 | 1.182 | 1.218 |
| (7) | f/f3 | 1.529 | 1.516 | 1.514 | 1.540 | 1.590 | 1.570 | 1.630 | 1.476 | 1.397 | 1.590 |
| (8) | v21 | 17.47 | 23.88 | 22.73 | 17.47 | 17.47 | 17.47 | 17.47 | 17.47 | 17.47 | 17.47 |
| (9) | N1 | 1.954 | 1.954 | 1.954 | 1.954 | 1.902 | 1.883 | 1.940 | 1.755 | 1.954 | 1.954 |
| (10) | Δv1r | 41.01 | 37.47 | 37.47 | 40.23 | 41.65 | 39.69 | 21.67 | 40.23 | 22.12 | 30.95 |
| (11) | BF/f | 0.25 | 0.25 | 0.25 | 0.23 | 0.28 | 0.26 | 0.28 | 0.28 | 0.27 | 0.25 |

As can be seen from the above-mentioned data, all the imaging lenses of Examples 1 to 10 satisfy Conditional Expressions (1) to (11), and are imaging lenses in which fluctuations in various aberrations during focusing are suppressed and various aberrations are satisfactorily corrected.

Figure 22:
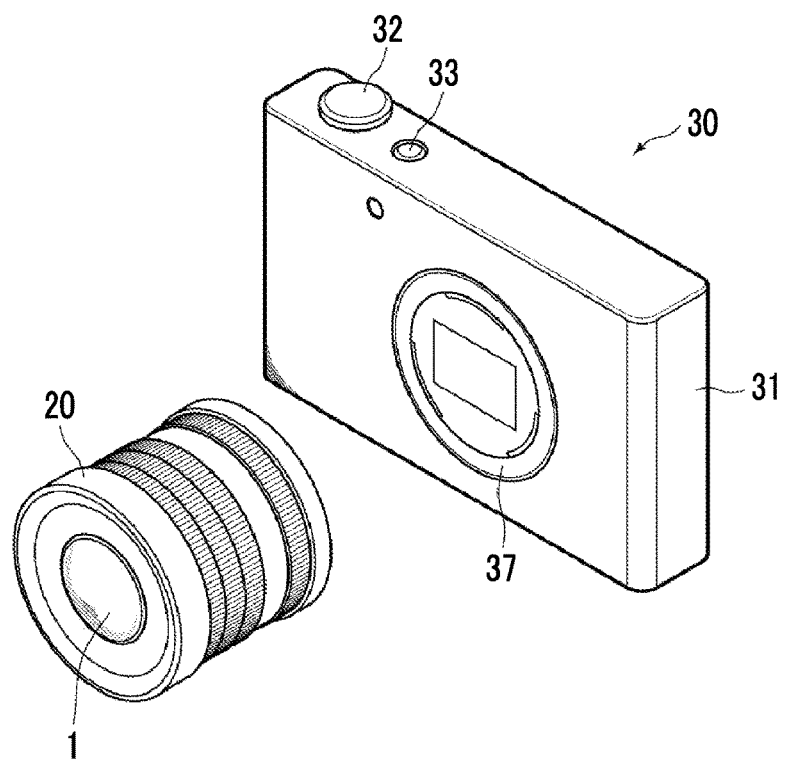
FIG. 22 is a schematic configuration diagram of an imaging apparatus according to an embodiment of the present invention as viewed from the front side.
Figure 23:
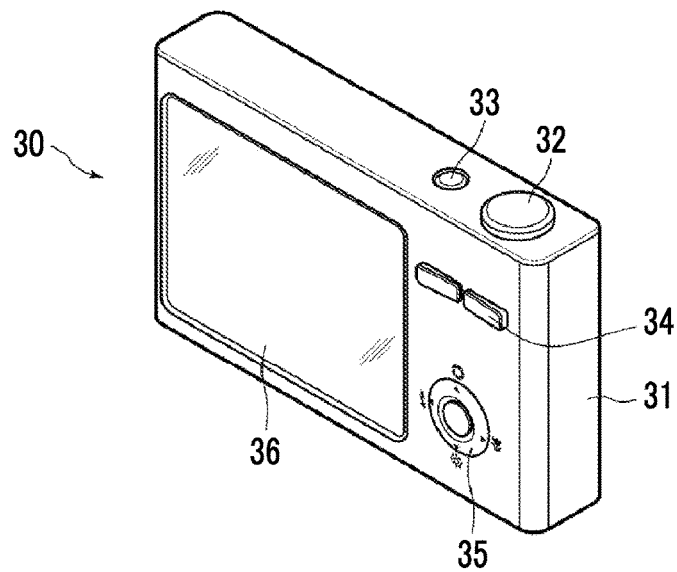
FIG. 23 is a schematic configuration diagram of an imaging apparatus according to the embodiment of the present invention as viewed from the rear side.

Next, an imaging apparatus according to an embodiment of the present invention will be described. FIGS. 22 and 23 show external views illustrating one configuration example of a mirrorless single-lens camera using the imaging lens of the embodiment of the present invention, as an example of the imaging apparatus of the embodiment of the present invention.

FIG. 22 is an appearance of the camera 30 viewed from the front side, and FIG. 23 is an appearance of the camera 30 viewed from the rear side. The camera 30 comprises a camera body 31, and a release button 32 and a power button 33 are provided on the upper side of the camera body 31. Further, operation sections 34 and 35 and a display section 36 are provided on the rear side of the camera body 31. The display section 36 is for displaying a captured image.

An imaging aperture, through which light from an imaging target is incident, is provided at the center on the front side of the camera body 31. A mount 37 is provided at a position corresponding to the imaging aperture. The interchangeable lens 20 is mounted on the camera body 31 with the mount 37 interposed therebetween. The interchangeable lens 20 is configured such that lens members constituting the imaging lens 1 of the present embodiment are housed in a lens barrel. In the camera body 31, there are provided an imaging element, a signal processing circuit, a storage medium, and the like. The imaging element such as a charge coupled device (CCD) outputs a captured image signal based on a subject image which is formed through the interchangeable lens 20. The signal processing circuit generates an image through processing of the captured image signal which is output from the imaging element. The storage medium stores the generated image. In this camera, by pressing the release button 32, image data, which is obtained through the imaging performed by capturing a still image or a moving image per one frame, is stored in a storage medium (not shown in the drawing) within the camera body 31.

By using the imaging lens according to the present embodiment as the interchangeable lens 20 in such a mirrorless single-lens camera, it is possible to perform focusing at high speed, and it is possible to obtain a high quality video in which various aberrations are satisfactorily corrected.

The present invention has been hitherto described through embodiments and examples, but the present invention is not limited to the above-mentioned embodiments and examples, and may be modified into various forms. For example, values such as the radius of curvature, the surface spacing, the refractive index, and the Abbe number of each lens component are not limited to the values shown in the numerical examples, and different values may be used therefor.

Further, the embodiment of the imaging apparatus has described the example applied to the single-lens digital camera having no reflex finder with reference to the drawings, but the present invention is not limited to this application. For example, the present invention can also be applied to a single-lens reflex camera, a film camera, a video camera, and the like.

What is claimed is:

1. An imaging lens comprising, in order from an object side:
a first lens group that has a positive refractive power;
a second lens group that has a negative refractive power; and
a third lens group that has a positive refractive power,
wherein during focusing from an object at infinity to a closest object, only the second lens group moves in a direction of an optical axis,
wherein a lens closest to the object side in the first lens group has a positive refractive power,
wherein the second lens group includes two or three lenses, a lens closest to the object side in the second lens group is a meniscus lens which is concave toward the object side and has a positive refractive power, and a lens adjacent to the lens closest to the object side on an image side in the second lens group has a negative refractive power,
wherein a lens closest to the image side in the third lens group is a single lens which is concave toward the object side and has a negative refractive power, and
wherein the following conditional expression is satisfied, $$1.2<(R21+R22)/(R21-R22)<3.5 \quad (1),$$

where R21 is a radius of curvature of an object side surface of the lens closest to the object side in the second lens group, and
R22 is a radius of curvature of an image side surface of the lens closest to the object side in the second lens group.

2. The imaging lens according to claim 1, wherein the first lens group has at least one group of cemented lenses in which at least one lens having a positive refractive power and at least one lens having a negative refractive power are combined.

3. The imaging lens according to claim 1, wherein the lens closest to the object side in the second lens group and the lens adjacent to the lens closest to the object side on the image side are cemented, a refractive index of the lens closest to the object side in the second lens group is greater than a refractive index of the lens adjacent to the lens closest to the object side on the image side.

4. The imaging lens according to claim 1, wherein the following conditional expression is satisfied, $$1.70<N2<2.2 \quad (2),$$

where N2 is a refractive index of the lens closest to the object side in the second lens group.

5. The imaging lens according to claim 1, wherein the following conditional expression is satisfied, $$60<\nu1max<90 \quad (3),$$

where ν1max is a maximum value of Abbe numbers of lenses constituting the first lens group.

6. The imaging lens according to claim 1, wherein the following conditional expression is satisfied, $$60<\nu3max<90 \quad (4),$$

where ν3max is a maximum value of Abbe numbers of lenses constituting the third lens group.

7. The imaging lens according to claim 1, wherein the following conditional expression is satisfied, $$-2.5<f/f2<-1.0 \quad (5),$$

where f is a focal length of the whole system in a state where the object at infinity is in focus, and
f2 is a focal length of the second lens group.

8. The imaging lens according to claim 1, wherein the following conditional expression is satisfied, $$0.9<f/f1<1.5 \quad (6),$$

where f is a focal length of the whole system in a state where the object at infinity is in focus, and
f1 is a focal length of the first lens group.

9. The imaging lens according to claim 1, wherein the following conditional expression is satisfied, $$1.0<f/f3<2.0 \quad (7),$$

where f is a focal length of the whole system in a state where the object at infinity is in focus, and
f3 is a focal length of the third lens group.

10. The imaging lens according to claim 1, wherein the following conditional expression is satisfied, $$15<\nu21<30 \quad (8),$$

where ν21 is an Abbe number of the lens closest to the object side in the second lens group.

11. The imaging lens according to claim 1, wherein the following conditional expression is satisfied, $$1.65<N1<2.2 \quad (9)$$

where N1 is a refractive index of the lens closest to the object side in the first lens group.

12. The imaging lens according to claim 1, wherein the following conditional expression is satisfied, $$15<\Delta\nu1r<50 \quad (10),$$

where Δν1r is a difference in Abbe number between a lens closest to the image side in the first lens group and a lens adjacent to the lens closest to the image side on the object side.

13. The imaging lens according to claim 1, wherein the following conditional expression is satisfied, $$0.10<BF/f<0.50 \quad (11),$$

where BF is an air conversion length from an image side surface of the lens, which is closest to the image side, to the image plane, and
f is a focal length of the whole system in a state where the object at infinity is in focus.

14. The imaging lens according to claim 1, wherein the following conditional expression is satisfied, $1.3<(R21+R22)/(R21-R22)<3.0$ (1-1), where R21 is a radius of curvature of an object side surface of the lens closest to the object side in the second lens group, and R22 is a radius of curvature of an image side surface of the lens closest to the object side in the second lens group.

15. The imaging lens according to claim 1, wherein the following conditional expression is satisfied, $$1.80<N2<2.2 \quad (2-1),$$

where N2 is a refractive index of the lens closest to the object side in the second lens group.

16. The imaging lens according to claim 1, wherein the following conditional expression is satisfied, $$65 < v1max < 90 \quad (3\text{-}1),$$

where v1max is a maximum value of Abbe numbers of lenses constituting the first lens group.

17. The imaging lens according to claim 1, wherein the following conditional expression is satisfied, $$65 < v3max < 90 \quad (4\text{-}1),$$

where v3max is a maximum value of Abbe numbers of lenses constituting the third lens group.

18. The imaging lens according to claim 1, wherein the following conditional expression is satisfied, $$-2.2 < f/f2 < -1.4 \quad (5\text{-}1),$$

where f is a focal length of the whole system in a state where the object at infinity is in focus, and
f2 is a focal length of the second lens group.

19. The imaging lens according to claim 1, wherein the following conditional expression is satisfied, $$1.0 < f/f1 < 1.4 \quad (6\text{-}1),$$

where f is a focal length of the whole system in a state where the object at infinity is in focus, and
f1 is a focal length of the first lens group.

20. An imaging apparatus comprising the imaging lens according to claim 1.

* * * * *